(12) United States Patent
Chen

(10) Patent No.: US 8,817,391 B2
(45) Date of Patent: Aug. 26, 2014

(54) OPTICAL SYSTEM

(71) Applicant: Largan Precision Co., Ltd., Taichung (TW)

(72) Inventor: Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 37 days.

(21) Appl. No.: 13/847,648

(22) Filed: Mar. 20, 2013

(65) Prior Publication Data

US 2014/0211329 A1 Jul. 31, 2014

(30) Foreign Application Priority Data

Jan. 31, 2013 (TW) .............................. 102103651 A

(51) Int. Cl.
- *G02B 3/02* (2006.01)
- *G02B 13/02* (2006.01)
- *G02B 9/34* (2006.01)

(52) U.S. Cl.
USPC ........... 359/715; 359/717; 359/739; 359/740; 359/748; 359/773; 359/795

(58) Field of Classification Search
USPC .......... 359/717, 715, 739, 740, 748, 773, 795
See application file for complete search history.

(56) References Cited

U.S. PATENT DOCUMENTS

| | | | |
|---|---|---|---|
| 8,000,030 B2 | 8/2011 | Tang | |
| 8,094,231 B2 | 1/2012 | Tsai | |
| 8,116,014 B2* | 2/2012 | Taniyama | 359/773 |
| 8,169,528 B2 | 5/2012 | Chen et al. | |
| 2008/0180816 A1* | 7/2008 | Nakamura | 359/773 |
| 2010/0103533 A1* | 4/2010 | Taniyama | 359/715 |
| 2010/0309367 A1* | 12/2010 | Iba et al. | 359/715 |
| 2012/0062782 A1* | 3/2012 | Huang | 359/715 |
| 2012/0176687 A1* | 7/2012 | Huang et al. | 359/715 |
| 2012/0194926 A1* | 8/2012 | Kubota et al. | 359/773 |
| 2013/0016278 A1* | 1/2013 | Matsusaka et al. | 359/714 |
| 2013/0148012 A1* | 6/2013 | Yamazaki et al. | 359/773 |
| 2013/0335836 A1* | 12/2013 | Chung et al. | 359/715 |

* cited by examiner

*Primary Examiner* — Evelyn A. Lester
(74) *Attorney, Agent, or Firm* — Morris Manning & Martin LLP; Tim Tingkang Xia, Esq.

(57) ABSTRACT

An optical system comprises, in order from an object side to an image side, a first lens group includes a first lens element with positive refractive power having a convex object-side surface; and a second lens group in order from the object side to the image side includes a second lens element with negative refractive power having a concave image-side surface, a third lens element with positive refractive power having a convex image-side surface, and a fourth lens element with negative refractive power having a concave object-side surface and a concave image-side surface, wherein the image-side surface of the fourth lens element changes from concave at a paraxial region to convex at a peripheral region, and both of the object-side surface and the image-side surface of the fourth lens element are aspheric.

18 Claims, 18 Drawing Sheets

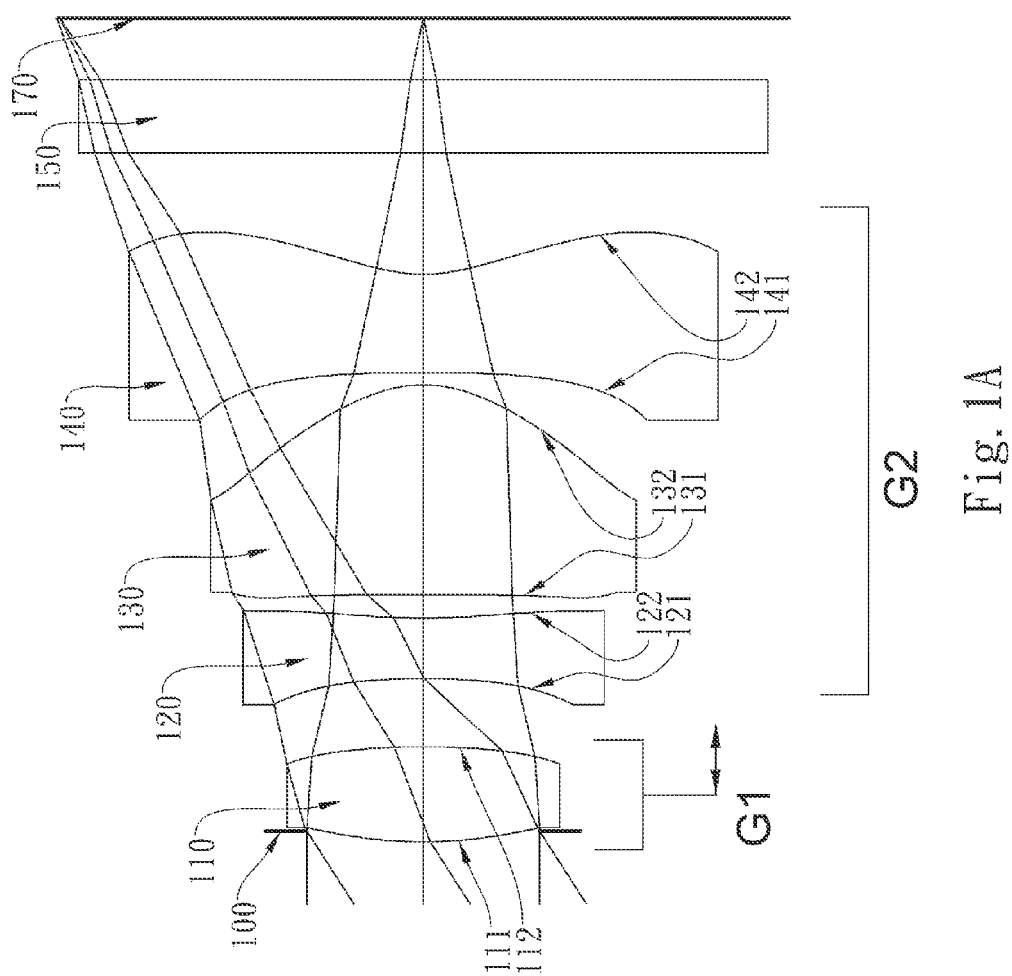

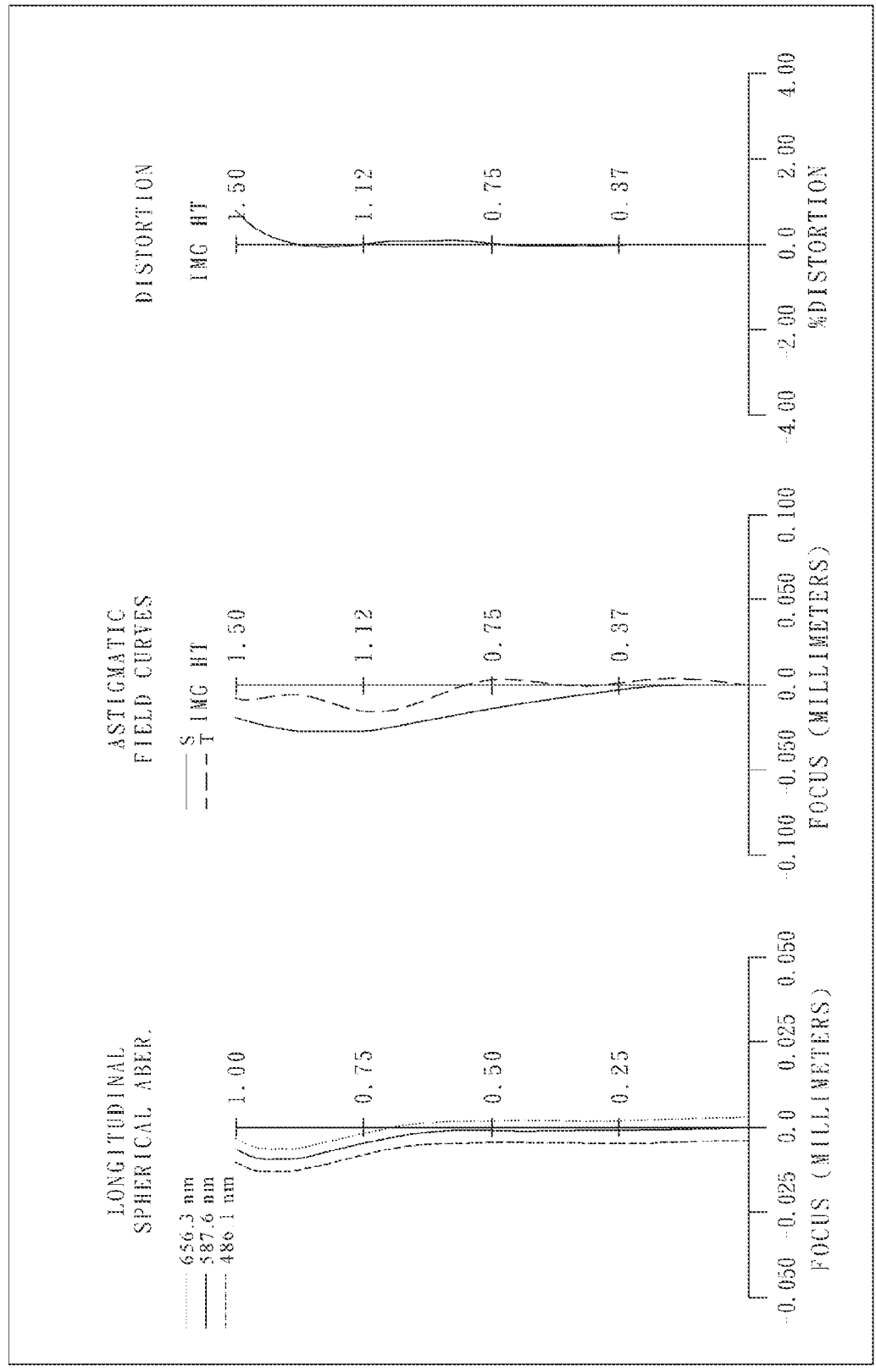

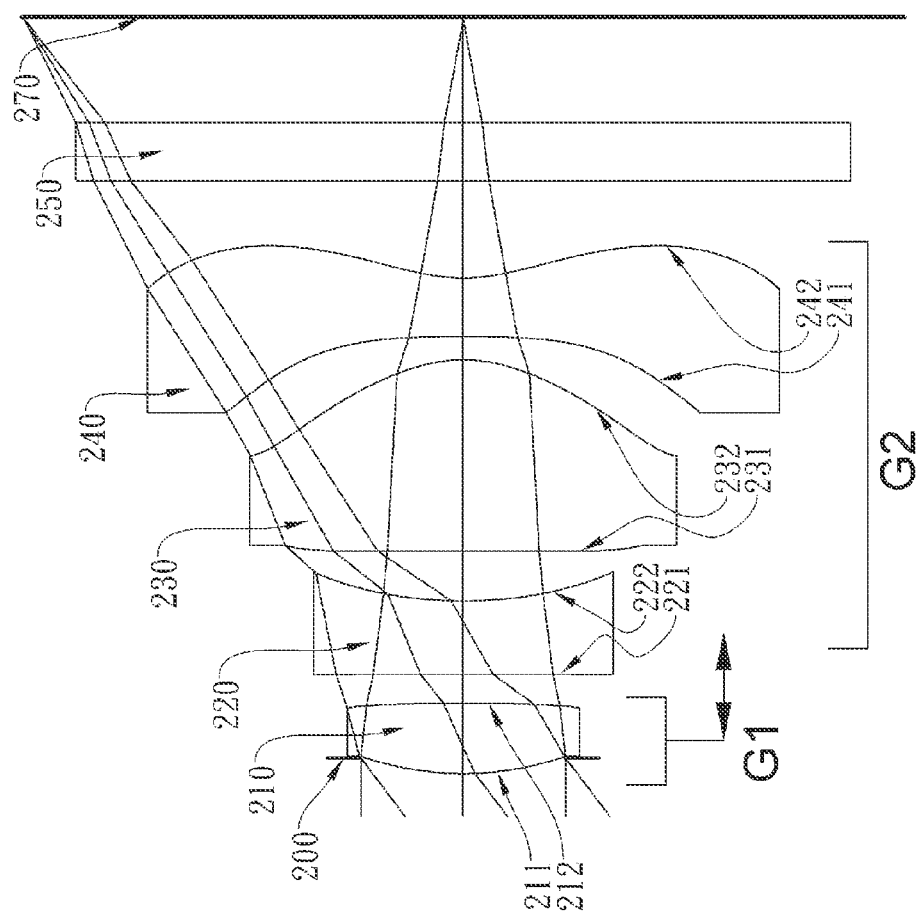

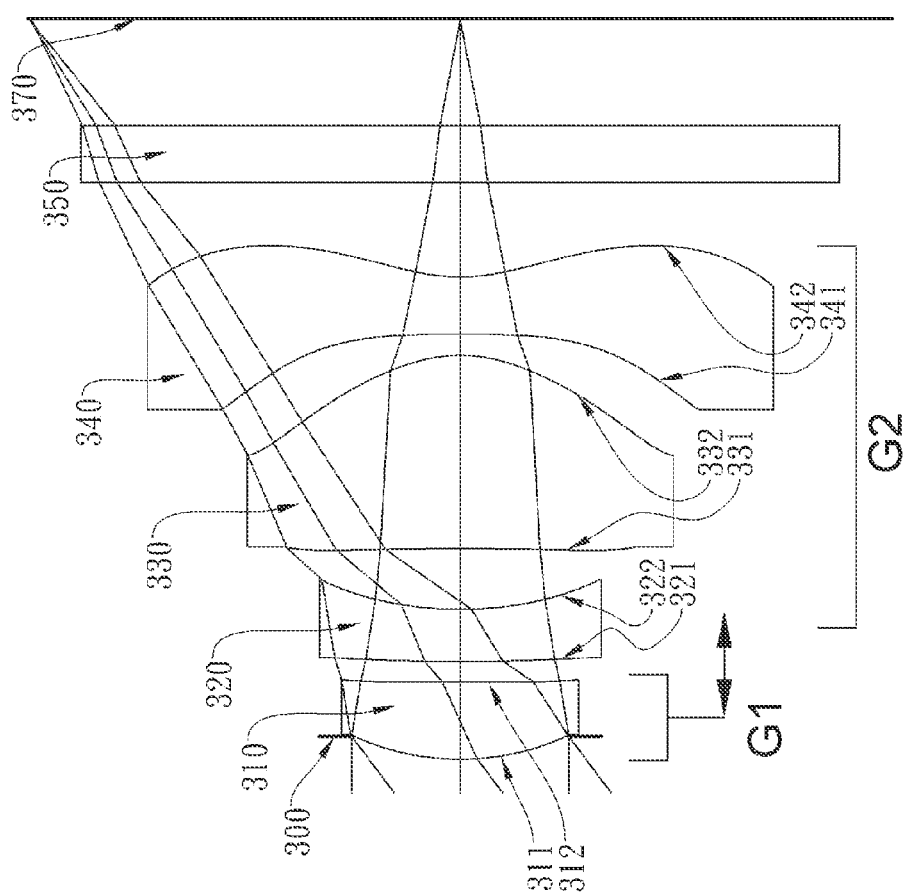

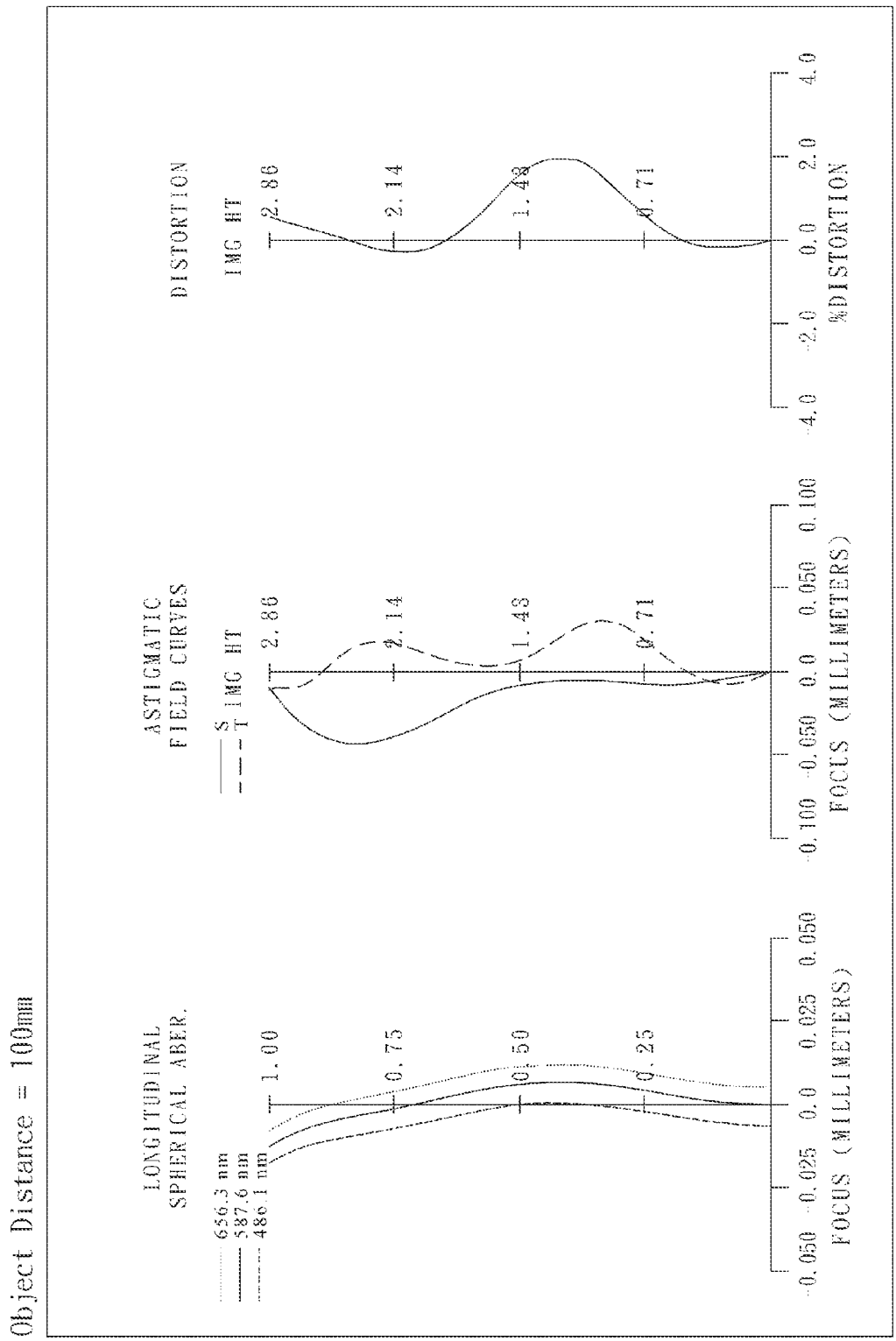

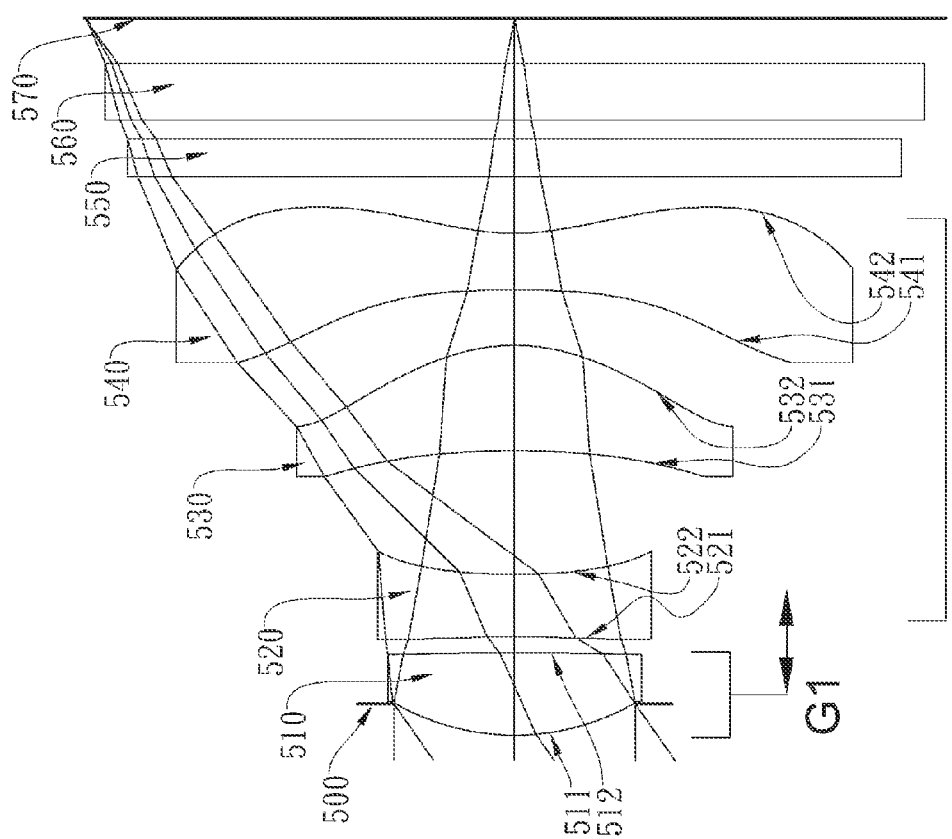

OPTICAL SYSTEM

RELATED APPLICATIONS

The application claims priority to Taiwan Application Serial Number 102103651, filed Jan. 31, 2013, which is herein incorporated by reference.

BACKGROUND

1. Technical Field

The present disclosure relates to an optical system. More particularly, the present disclosure relates to a compact optical system applicable to electronic products.

2. Description of Related Art

In recent years, as the popularity of mobile products with camera functionalities, the demand for miniaturized photographing systems is increasing. The sensor of a conventional photographing system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact photographing systems have gradually evolved toward the field of higher megapixels, there is an increasing demand for compact photographing systems featuring better image quality.

A conventional compact photographing system applied in a portable electronic product typically utilizes a three-element lens structure, such as the one disclosed in the U.S. Pat. No. 8,094,231. Due to the popularity of mobile products with high-end specifications, such as smart phones and PDAs (Personal Digital Assistants), the requirements for high resolution and image quality of modern compact optical lens systems increases significantly. However, the conventional three-element lens structure cannot satisfy these requirements of the compact photographing systems. Although the five-element lens structure has a longer total track of length, such as the one disclosed in the U.S. Pat. No. 8,000,030, is not favorable for being applied to compact electronic products.

Another conventional compact photographing system provides a fixed-focus lens system which is a fixed lens system with a fixed focal length. For example, the one disclosed in the U.S. Pat. No. 8,169,528 is a four-element lens structure. It has limited capabilities in focusing an object at a close distance and infinity resulting in producing poor image quality. Therefore, as there is a trend towards compact photographing systems and higher megapixels, having an accurate focusing capability both at a close distance and infinity has become more and more important. Although the digital image processing technique of the extended depth of field (EDOF) can compensate for the deficiency of the fixed-focus lens system, the image quality will be compromised and the consumed power will be more.

Therefore, a photographing system applied in a mobile electronic product for exhibiting a small amount of movement in focusing objects from far to near while maintaining a compact size and low power is needed in the art.

SUMMARY

According to one aspect of the present disclosure, an optical system comprises, in order from an object side to an image side, a first lens group and a second lens group. The first lens group comprises a first lens element, wherein the first lens element with positive refractive power has a convex object-side surface. The second lens group comprises, in order from the object side to the image side, a second lens element, a third lens element and a fourth lens element. The second lens element with negative refractive power has a concave image-side surface. The third lens element with positive refractive power has a convex image-side surface. The fourth lens element with negative refractive power has a concave object-side surface and a concave image-side surface at a paraxial region, wherein the image-side surface of the fourth lens element changes from concave at the paraxial region to convex at a peripheral region, and the object-side surface and the image-side surface of the fourth lens element are aspheric. When an object moves closer towards or further away the optical system, the focusing adjustment is performed by moving the first lens element along an optical axis. The optical system has a total of four lens elements with refractive power. When a difference of an axial distance between the first lens element and the second lens element of the optical system focused on an object at a close distance and infinity is $\Delta T12$, and a central thickness of the second lens element is CT2, the following relationship is satisfied:

$$0.05 < |\Delta T12|/CT2 < 0.80.$$

BRIEF DESCRIPTION OF THE DRAWINGS

The disclosure can be more fully understood by reading the following detailed description of the embodiment, with reference made to the accompanying drawings as follows:

FIG. 1A is a schematic view of an optical system according to the 1st embodiment of the present disclosure;

FIG. 1C shows spherical aberration curves, astigmatic field curves and a distortion curve of the optical system according to the 1st embodiment when the object is at 100 mm;

FIG. 2A is a schematic view of an optical system according to the 2nd embodiment of the present disclosure;

FIG. 3A is a schematic view of an optical system according to the 3rd embodiment of the present disclosure;

FIG. 4C shows spherical aberration curves, astigmatic field curves and a distortion curve of the optical system according to the 4th embodiment when the object is at 100 mm;

FIG. 5A is a schematic view of an optical system according to the 5th embodiment of the present disclosure;

DETAILED DESCRIPTION

Figure 1B:
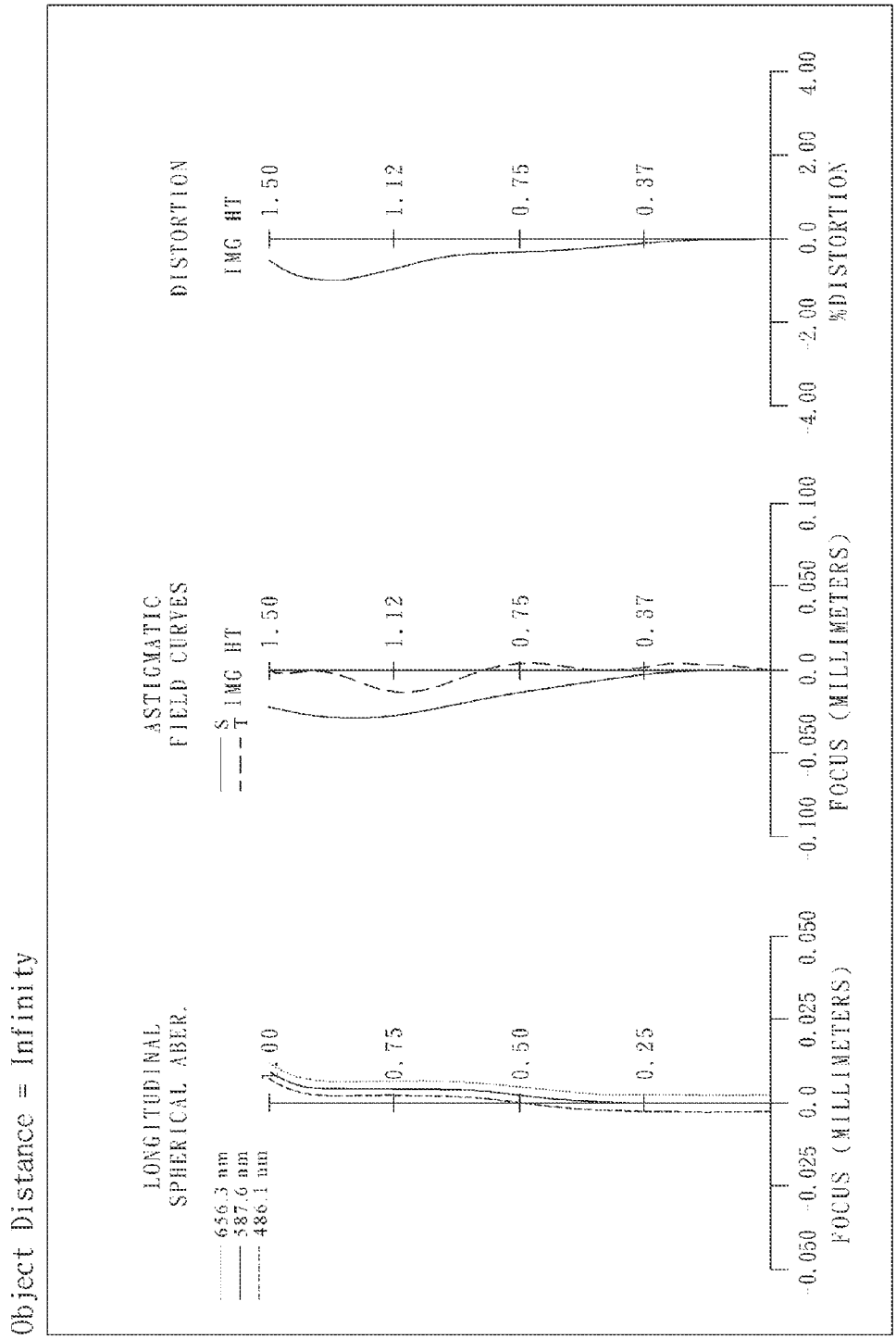
FIG. 1B shows spherical aberration curves, astigmatic field curves and a distortion curve of the optical system according to the 1st embodiment when the object is at infinity.

An optical system comprises, in order from an object side to an image side, a first lens group (G1) and a second lens group (G2). The first lens group comprises a first lens element. The second lens group comprises, in order from the object side to the image side, a second lens element, a third lens element and a fourth lens element.

The first lens element has positive refractive power, so that it provides the optical system with the positive refractive power as it needs to be so as to reduce the total track length of the optical system. Moreover, the first lens element has a convex object-side surface, so that the total track length of the optical system can be more effectively reduced.

The second lens element has negative refractive power, so that it is favorable for correcting the aberration generated from the first lens element. The second lens element can have a concave object-side surface and has a concave image-side surface, so that it is favorable for further correcting the aberration.

The third lens element has positive refractive power, so that it is favorable for reducing the system sensitivity. The third lens element has a convex image-side surface, so that it is favorable for further reducing the system sensitivity and the spherical aberration.

The fourth lens element has negative refractive power, so that it is favorable for correcting the aberration and reducing the system sensitivity. The fourth lens element has a concave object-side surface and a concave image-side surface at a paraxial region, so that the principal point will be positioned away from the image plane so as to reduce the total track length of the optical system. Furthermore, the image-side surface of the fourth lens element changes from concave at the paraxial region to convex at a peripheral region, so that it is favorable for reducing the angle at which the incident light projects onto an image sensor from the off-axis so as to increase the responding rate of the image sensor and to further correct the aberration of the off-axis.

When a difference of an axial distance between the first lens element and the second lens element of the optical system focused on an object at a close distance and infinity is $\Delta T12$, and a central thickness of the second lens element is CT2, the following relationship is satisfied: $0.05<|\Delta T12|/CT2<0.80$. Therefore, it is favorable for improving the focusing accuracy of the optical system focused at a close distance and infinity by a small amount of movement. Furthermore, it is favorable for maintaining a compact size and low power for the optical system. Preferably, the following relationship is satisfied: $0.05<|\Delta T12|/CT2<0.50$.

The optical system can further comprise an aperture stop which locates between the object and the second lens element. Therefore, it is favorable for making a balance between the Telecentric effect and the wide angle.

When a difference of a distance between the object-side surface of the first lens element and an image plane of the optical system focused on an object at a close distance and infinity is $\Delta TTL$, and the difference of an axial distance between the first lens element and the second lens element of the optical system focused on an object at a close distance and infinity is $\Delta T12$, the following relationship is satisfied: $0.95<|\Delta TTL|/|\Delta T12|<1.05$. Therefore, the total track length of the optical system will be proper and the focusing accuracy of the optical system focused at a close distance and infinity will be improved.

When a difference of the maximal field of view of the optical system focused on an object at a close distance and infinity is $\Delta FOV$, the following relationship is satisfied: $0.1<\sin(|\Delta FOV|)*10<1.0$. Therefore, it is favorable for obtaining sufficient field of view.

When a focal length of the optical system focused on an object at infinity is Fi, and a focal length of the third lens element is f3, the following relationship is satisfied: $1.5<Fi/f3<3.0$. It is favorable for reducing spherical aberration so as to improve image quality.

When a curvature radius of the image-side surface of the fourth lens element is R8, and a curvature radius of the object-side surface of the fourth lens element is R7, the following relationship is satisfied: $-1.0<R8/R7<0$. It is favorable for correcting the aberration so as to improve resolution. Preferably, the following relationship is satisfied: $-0.5<R8/R7<0$.

When a curvature radius of the object-side surface of the third lens element is R5, and a curvature radius of the image-side surface of the third lens element is R6, the following relationship is satisfied: $1.0<(R5+R6)/(R5-R6)<3.0$. It is favorable for reducing the system sensitivity and spherical aberration.

When an Abbe number of the first lens element is V1, and an Abbe number of the second lens element is V2, the following relationship is satisfied: $1.65<V1/V2<3.0$. It is favorable for correcting the chromatic aberration.

When the focal length of the optical system focused on an object at infinity is Fi, and a focal length of the optical system focused on an object at a close distance is Fm, the following relationship is satisfied: $1.0<Fi/Fm<1.06$. It is favorable for improving the focusing accuracy of the optical system by a small amount of movement, while the optical system focused at a close distance and infinity.

When a curvature radius of the object-side surface of the first lens element is R1, and a curvature radius of the image-side surface of the first lens element is R2, the following relationship is satisfied: $-0.7<R1/R2<0.3$. It is favorable for reducing the spherical aberration and astigmatism.

When the focal length of the optical system focused on an object at infinity is Fi, and a focal length of the fourth lens element is f4, the following relationship is satisfied: $-3.0<Fi/f4<-1.6$. It is favorable for effectively correcting the aberration.

When an f-number of the optical system is Fno, the following relationship is satisfied: $1.8<Fno<3.0$. It is favorable for sufficient light exposure, while the optical system focused at a close distance or infinity.

When a distance between the object-side surface of the first lens element and the image-side surface of the fourth lens element of the optical system focused on an object at infinity is TDi, the following relationship is satisfied: $1.5 \text{ mm}<TDi<4.5 \text{ mm}$. It is favorable for keeping the optical system a compact size.

When a difference of a focal length of the optical system focused on an object at a close distance and infinity is $\Delta F$, and the difference of an axial distance between the first lens element and the second lens element of the optical system focused on an object at a close distance and infinity is $\Delta T12$, the following relationship is satisfied: $|\Delta F|/|\Delta T12|<2.0$. It is favorable for reducing the total track length of the optical system so as to improve the focusing accuracy, while the optical system focused at a close distance or infinity.

According to the optical system of the present disclosure, the lens elements thereof can be made of glass or plastic material. When the lens elements are made of glass material, the distribution of the refractive power of the optical system may be more flexible for design. When the lens elements are made of plastic material, the manufacturing cost can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical system. Therefore, the total track length of the optical system can also be reduced.

According to the optical system of the present disclosure, the optical system can include at least one stop, there can be at least one stop provided, such as an aperture stop, a glare stop or a field stop. Said glare stop or said field stop is for eliminating the stray light and thereby improving the image resolution thereof.

According to the optical system of the present disclosure, when the lens element has a convex surface, it indicates that the surface is convex at the paraxial region; and when the lens element has a concave surface, it indicates that the surface is concave at the paraxial region.

According to the optical system of the present disclosure, the optical system is featured with good correction ability and high image quality, and can be applied to 3D (three-dimensional) image capturing applications, in products such as digital cameras, mobile devices and tablets.

According to the above description of the present disclosure, the following 1st-6th specific embodiments are provided for further explanation.

1st Embodiment

FIG. 1A is a schematic view of an optical system according to the 1st embodiment of the present disclosure. FIG. 1B shows spherical aberration curves, astigmatic field curves and a distortion curve of the optical system according to the 1st embodiment (when the object is at infinity; i.e., at infinity). FIG. 1C shows spherical aberration curves, astigmatic field curves and a distortion curve of the optical system according to the 1st embodiment (when the object is at 100 mm; i.e., at a close distance). In FIG. 1A, the optical system mainly comprises four lens elements with refractive power, in order from an object side to an image side:

A first lens group (G1) comprises,

A first lens element 110 with positive refractive power has a convex object-side surface 111 and a convex image-side surface 112, and is made of plastic material. The object-side surface 111 and the image-side surface 112 of the first lens element 110 are aspheric; and A second lens group (G2) comprises, in order from the object side to the image side:

A second lens element 120 with negative refractive power has a concave object-side surface 121 and a concave image-side surface 122, and is made of plastic material. The object-side surface 121 and the image-side surface 122 of the second lens element 120 are aspheric.

A third lens element 130 with positive refractive power has a concave object-side surface 131 and a convex image-side surface 132, and is made of plastic material. The object-side surface 131 and the image-side surface 132 of the third lens element 130 are aspheric.

A fourth lens element 140 with negative refractive power has a concave object-side surface 141 and a concave image-side surface 142 at a paraxial region, wherein the image-side surface 142 of the fourth lens element 140 changes from concave at the paraxial region to convex at a peripheral region. The fourth lens element 140 is made of plastic material, and the object-side surface 141 and the image-side surface 142 thereof are aspheric.

The optical system further comprises an aperture stop 100 which is disposed between an object and the first lens element 110. An IR-cut filter 150 made of glass is located between the fourth lens element 140 and the image plane 170, and has no effect on the focal length of the optical system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

wherein,

X is the distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

When the object is at infinity, it means that the object is at infinity. Furthermore, when the object is at 100 mm, it means that the object is at a close distance. In the optical system according to the 1st embodiment, when a focal length of the optical system focused on an object at infinity is Fi, a focal length of the optical system focused on an object at a close distance is Fm, a maximal field of view of the optical system focused on an object at infinity is FOVi, a maximal field of view of the optical system focused on an object at a close distance is FOVm, and an f-number of the optical system is Fno, these parameters have the following values: Fi=2.35 (mm); Fm=2.34 (mm); FOVi=65.2 (deg.); FOVm=63.6 (deg.); and Fno=2.45.

In the optical system according to the 1st embodiment, when the Abbe number of the first lens element 110 is V1, and the Abbe number of the second lens element 120 is V2, the following relationship is satisfied:

$V1/V2=2.39$.

In the optical system according to the 1st embodiment, when a difference of a focal length of the optical system focused on an object at a close distance and infinity is ΔF, and a difference of an axial distance between the first lens element 110 and the second lens element 120 of the optical system focused on an object at a close distance and infinity is ΔT12, the following relationship is satisfied: |ΔF|/|ΔT12|=0.250.

In the optical system according to the 1st embodiment, when the difference of an axial distance between the first lens element 110 and the second lens element 120 of the optical system focused on an object at a close distance and infinity is ΔT12, and a central thickness of the second lens element 120 is CT2, the following relationship is satisfied: |ΔT12|/CT2=0.160.

In the optical system according to the 1st embodiment, when a difference of a distance between the object-side surface 111 of the first lens element 110 and an image plane 170 of the optical system focused on an object at a close distance and infinity is ΔTTL, and the difference of an axial distance between the first lens element 110 and the second lens element 120 of the optical system focused on an object at a close distance and infinity is ΔT12, the following relationship is satisfied: |ΔTTL|/|ΔT12|=1.000.

In the optical system according to the 1st embodiment, when a difference of the maximal field of view of the optical system focused on an object at a close distance and infinity is ΔFOV, the following relationship is satisfied: sin(|ΔFOV|)*10=0.276.

In the optical system according to the 1st embodiment, when a curvature radius of the object-side surface 111 of the first lens element 110 is R1, and a curvature radius of the image-side surface 112 of the first lens element 110 is R2, the following relationship is satisfied: R1/R2=−0.510.

In the optical system according to the 1st embodiment, when a curvature radius of the object-side surface 131 of the third lens element 130 is R5, and a curvature radius of the image-side surface 132 of the third lens element 130 is R6, the following relationship is satisfied: (R5+R6)/(R5−R6)=1.01.

In the optical system according to the 1st embodiment, when a curvature radius of the image-side surface 142 of the fourth lens element 140 is R8, and a curvature radius of the object-side surface 141 of the fourth lens element 140 is R7, the following relationship is satisfied: R8/R7=−0.07.

In the optical system according to the 1st embodiment, when the focal length of the optical system focused on an object at infinity is Fi, and a focal length of the third lens element 130 is f3, the following relationship is satisfied: Fi/f3=2.369.

In the optical system according to the 1st embodiment, when the focal length of the optical system focused on an object at infinity is Fi, and a focal length of the fourth lens element 140 is f4, the following relationship is satisfied: Fi/f4=−2.148.

In the optical system according to the 1st embodiment, when the focal length of the optical system focused on an object at infinity is Fi, and the focal length of the optical system focused on an object at a close distance is Fm, the following relationship is satisfied: Fi/Fm=1.004.

In the optical system according to the 1st embodiment, when a distance between the object-side surface 111 of the first lens element 110 and the image-side surface 142 of the fourth lens element 140 of the optical system focused on an object at infinity is TDi, the following relationship is satisfied: TDi=2.379 (mm).

In the optical system according to the 1st embodiment, when an axial distance between the first lens element 110 and the second lens element 120 of the optical system focused on an object at infinity is T12i, and an axial distance between the first lens element 110 and the second lens element 120 of the optical system focused on an object at a close distance is T12m. Therefore, the difference of an axial distance between the first lens element 110 and the second lens element 120 of the optical system focused on an object at a close distance and infinity is ΔT12 which is T12i−T12m or T12m−T12i.

In the optical system according to the 1st embodiment, when a distance between the object-side surface 111 of the first lens element 110 and an image plane 170 of the optical system focused on an object at infinity is TTLi, and a distance between the object-side surface 111 of the first lens element 110 and an image plane 170 of the optical system focused on an object at a close distance is TTLm. Therefore, the difference of a distance between the object-side surface 111 of the first lens element 110 and an image plane 170 of the optical system focused on an object at a close distance and infinity is ΔTTL which is TTLi−TTLm or TTLm−TTLi.

In the optical system according to the 1st embodiment, when the maximal field of view of the optical system focused on an object at infinity is FOVi, and the maximal field of view of the optical system focused on an object at a close distance is FOVm. Therefore, the difference of the maximal field of view of the optical system focused on an object at a close distance and infinity is ΔFOV which is FOVi−FOVm or FOVm−FOVi.

In the optical system according to the 1st embodiment, when the focal length of the optical system focused on an object at infinity is Fi, and the focal length of the optical system focused on an object at a close distance is Fm. Therefore, the difference of a focal length of the optical system focused on an object at a close distance and infinity is ΔF which is Fi−Fm or Fm−Fi.

The detailed optical data of the 1st embodiment are shown in Table 1, and the aspheric surface data are shown in Table 2 below.

TABLE 1

Embodiment 1
Object Distance = Infinity: f = 2.35 mm, Fno = 2.45, HFOV = 32.6 deg.

| Surface # | | Curvature Radius | | Thickness | Material | Index | Abbe # | Focal Length |
|---|---|---|---|---|---|---|---|---|
| 0 | Object | Plano | | Infinity, 100 | | | | |
| 1 | Ape. Stop | Plano | | −0.045 | | | | |
| 2 | Lens 1 | 1.753 | ASP | 0.392 | Plastic | 1.544 | 55.9 | 2.20 |
| 3 | | −3.465 | ASP | 0.281, 0.321 | | | | |
| 4 | Lens 2 | −3.390 | ASP | 0.250 | Plastic | 1.633 | 23.4 | −2.50 |
| 5 | | 3.060 | ASP | 0.096 | | | | |
| 6 | Lens 3 | −106.189 | ASP | 0.865 | Plastic | 1.514 | 56.8 | 0.99 |
| 7 | | −0.507 | ASP | 0.050 | | | | |
| 8 | Lens 4 | −8.685 | ASP | 0.405 | Plastic | 1.535 | 55.7 | −1.09 |
| 9 | | 0.637 | ASP | 0.500 | | | | |
| 10 | IR-cut filter | Plano | | 0.300 | Glass | 1.517 | 64.2 | — |
| 11 | | Plano | | 0.255 | | | | |
| 12 | Image | Plano | | — | | | | |

Note:
Reference wavelength (d-line) is 587.6 nm.
*Half of the effective diameter of the aperture stop at Surface 1 is 0.479 mm.
* Object Distance = 100 mm: surface 3 thickness = 0.321 mm, f = 2.34 mm

TABLE 2

Aspheric Coefficients

| Surface # | 2 | 3 | 4 | 5 |
|---|---|---|---|---|
| k = | −1.6384E−01 | −7.2258E+01 | 2.2964E+01 | −3.6136E+01 |
| A4 = | −9.4466E−02 | −3.6894E−01 | −2.3315E−01 | −9.4586E−02 |
| A6 = | −1.3259E−01 | 7.9824E−01 | −7.6490E−02 | −1.1197E−01 |
| A8 = | −3.7718E−01 | −6.6924E+00 | 5.5350E−02 | −8.7961E−01 |
| A10 = | −3.4469E+00 | 2.6019E+01 | −1.5879E+00 | 2.5233E+00 |
| A12 = | 2.1035E+01 | −5.4124E+01 | 1.2584E+01 | −1.4306E+00 |
| A14 = | −5.0628E+01 | 4.1325E+01 | −1.9255E+01 | 2.1277E+00 |
| A16 = | 2.4041E+01 | −1.2680E+00 | 9.2636E+00 | −3.2103E+00 |

| Surface # | 6 | 7 | 8 | 9 |
|---|---|---|---|---|
| k = | −1.0000E+02 | −3.3558E+00 | −1.0000E+00 | −6.6058E+00 |
| A4 = | −1.0665E−01 | −5.1963E−01 | −9.8690E−02 | −3.2477E−01 |
| A6 = | 3.8544E−02 | 1.0836E+00 | −3.8835E−01 | 5.2078E−01 |
| A8 = | 6.5533E−01 | −1.9480E+00 | 1.3909E+00 | −7.8404E−01 |
| A10 = | −7.0562E+00 | 1.5782E+00 | −3.2122E+00 | 7.2595E−01 |
| A12 = | 2.5208E+01 | 1.3956E+00 | 4.2116E+00 | −3.9562E−01 |
| A14 = | −3.2978E+01 | −3.0337E+00 | −2.8684E+00 | 1.1240E−01 |
| A16 = | 1.4716E+01 | 1.5108E+00 | 7.0594E−01 | −1.2285E−02 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 2B:
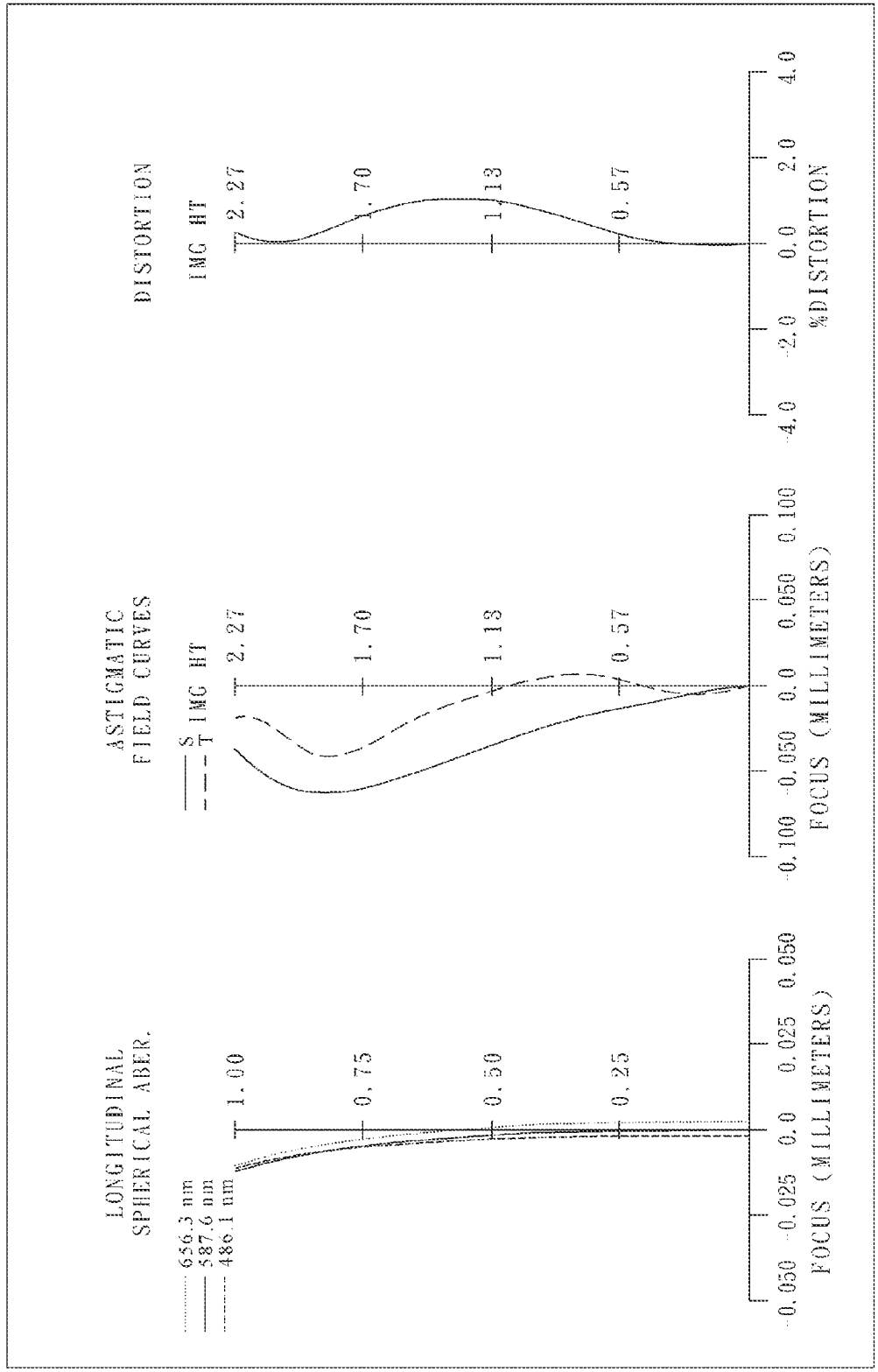
FIG. 2B shows spherical aberration curves, astigmatic field curves and a distortion curve of the optical system according to the 2nd embodiment when the object is at infinity.
Figure 2C:
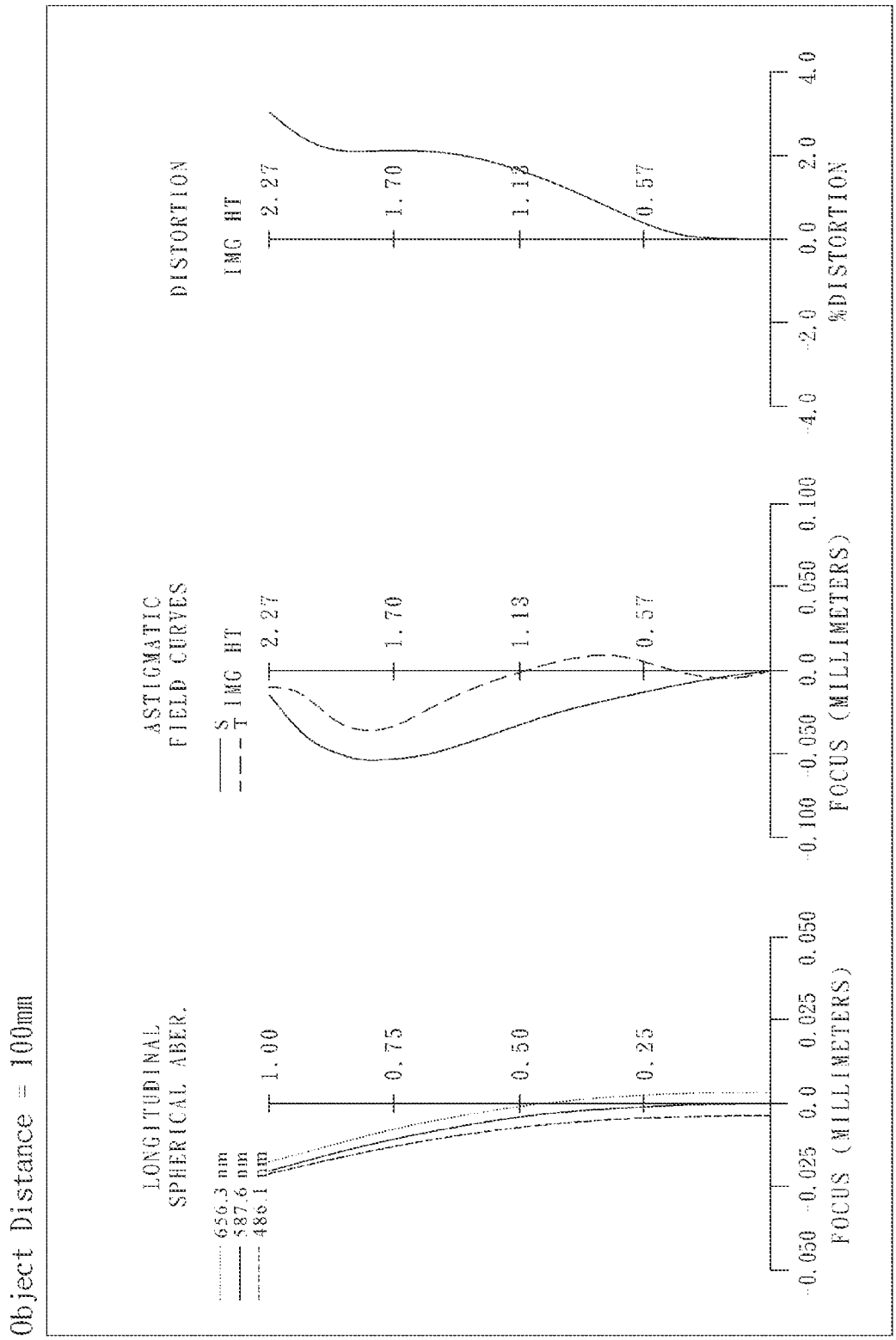
FIG. 2C shows spherical aberration curves, astigmatic field curves and a distortion curve of the optical system according to the 2nd embodiment when the object is at 100 mm.

FIG. 2A is a schematic view of an optical system according to the 2nd embodiment of the present disclosure. FIG. 2B shows spherical aberration curves, astigmatic field curves and a distortion curve of the optical system according to the 2nd embodiment (when the object is at infinity; i.e., at infinity). FIG. 2C shows spherical aberration curves, astigmatic field curves and a distortion curve of the optical system according to the 2nd embodiment (when the object is at 100 mm; i.e., at a close distance). In FIG. 2A, the optical system mainly comprises four lens elements with refractive power, in order from an object side to an image side:

A first lens group (G1) comprises,

A first lens element 210 with positive refractive power has a convex object-side surface 211 and a convex image-side surface 212, and is made of glass material. The object-side surface 211 and the image-side surface 212 of the first lens element 210 are aspheric; and A second lens group (G2) comprises, in order from the object side to the image side:

A second lens element 220 with negative refractive power has a convex object-side surface 221 and a concave image-side surface 222, and is made of plastic material. The object-side surface 221 and the image-side surface 222 of the second lens element 220 are aspheric.

A third lens element 230 with positive refractive power has a concave object-side surface 231 and a convex image-side surface 232, and is made of plastic material. The object-side surface 231 and the image-side surface 232 of the third lens element 230 are aspheric.

A fourth lens element 240 with negative refractive power has a concave object-side surface 241 and a concave image-side surface 242 at a paraxial region, wherein the image-side surface 242 of the fourth lens element 240 changes from concave at the paraxial region to convex at a peripheral region. The fourth lens element 240 is made of plastic material, and the object-side surface 241 and the image-side surface 242 thereof are aspheric.

The optical system further comprises an aperture stop 200 which is disposed between an object and the first lens element 210. An IR-cut filter 250 made of glass is located between the fourth lens element 240 and the image plane 270, and has no effect on the focal length of the optical system.

The detailed optical data of the 2nd embodiment are shown in Table 3 and the aspheric surface data are shown in Table 4 below.

TABLE 3

Embodiment 2
Object Distance = Infinity: f = 2.99 mm, Fno = 2.83, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity, 100 | | | | |
| 1 | Ape. Stop | Plano | | −0.080 | | | | |
| 2 | Lens 1 | 1.580 | ASP | 0.363 | Glass | 1.542 | 62.9 | 2.56 |
| 3 | | −10.633 | ASP | 0.149, 0.211 | | | | |
| 4 | Lens 2 | 81.367 | ASP | 0.378 | Plastic | 1.633 | 23.4 | −3.70 |
| 5 | | 2.270 | ASP | 0.256 | | | | |
| 6 | Lens 3 | −98.269 | ASP | 0.987 | Plastic | 1.535 | 55.7 | 1.38 |
| 7 | | −0.733 | ASP | 0.120 | | | | |
| 8 | Lens 4 | −8.685 | ASP | 0.302 | Plastic | 1.535 | 55.7 | −1.47 |

TABLE 3-continued

Embodiment 2
Object Distance = Infinity: f = 2.99 mm, Fno = 2.83, HFOV = 37.2 deg.

| Surface # | | Curvature Radius | | Thickness | Material | Index | Abbe # | Focal Length |
|---|---|---|---|---|---|---|---|---|
| 9 | | 0.878 | ASP | 0.500 | | | | |
| 10 | IR-cut filter | Plano | | 0.300 | Glass | 1.517 | 64.2 | — |
| 11 | | Plano | | 0.545 | | | | |
| 12 | Image | Plano | | — | | | | |

Note:
Reference wavelength (d-line) is 587.6 nm.
*Half of the effective diameter of the aperture stop at Surface 1 is 0.528 mm.
* Object Distance = 100 mm: surface 3 thickness = 0.211 mm, f = 2.97 mm

TABLE 4

Aspheric Coefficients

| Surface # | 2 | 3 | 4 | 5 |
|---|---|---|---|---|
| k = | −1.5269E−01 | −9.1715E+01 | 1.0000E+02 | 1.6168E+00 |
| A4 = | −2.3609E−02 | −2.9219E−02 | −2.5673E−02 | 1.2425E−02 |
| A6 = | −7.0145E−03 | −2.0351E−02 | −3.6805E−02 | −1.0576E−03 |
| A8 = | −1.4697E−01 | −2.9285E−01 | 4.2682E−02 | −2.3236E−02 |
| A10 = | −1.2503E−01 | 7.3092E−01 | 5.2610E−02 | 9.1609E−02 |
| A12 = | 5.5467E−01 | −5.8722E−01 | 2.5147E−01 | 2.3286E−03 |
| A14 = | 4.5721E−01 | −3.1971E−01 | −9.7121E−02 | −5.3219E−03 |
| A16 = | −3.2283E+00 | −1.3362E+00 | −6.5668E−01 | −5.7544E−02 |

| Surface # | 6 | 7 | 8 | 9 |
|---|---|---|---|---|
| k = | 1.0000E+02 | −4.0425E+00 | −1.0000E+00 | −7.8647E+00 |
| A4 = | 2.2666E−03 | −1.8715E−01 | −1.9039E−01 | −1.7014E−01 |
| A6 = | 2.8053E−02 | 1.3494E−01 | −3.1179E−02 | 9.5296E−02 |
| A8 = | 5.6619E−02 | −9.0644E−02 | 1.1534E−01 | −4.5747E−02 |
| A10 = | −1.5619E−01 | 5.2528E−02 | −9.6877E−02 | 1.4445E−02 |
| A12 = | 2.6075E−01 | 2.1392E−02 | 4.6806E−02 | −3.4806E−03 |
| A14 = | −1.5138E−01 | −1.1737E−02 | −1.0081E−02 | 6.9440E−04 |
| A16 = | 2.1106E−02 | 2.1250E−03 | 6.2336E−04 | −8.4449E−05 |

In the optical system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| Fi [mm] | 2.99 | sin(|ΔFOV|)*10 | 0.507 |
|---|---|---|---|
| Fm [mm] | 2.97 | R1/R2 | −0.150 |
| FOVi [deg.] | 74.4 | (R5 + R6)/(R5 − R6) | 1.02 |
| FOVm [deg.] | 71.5 | R8/R7 | −0.10 |
| Fno | 2.83 | Fi/f3 | 2.170 |
| V1/V2 | 2.69 | Fi/f4 | −2.026 |
| |ΔFl|/|ΔT12| | 0.323 | Fi/Fm | 1.007 |
| |ΔT12|/CT2 | 0.164 | TDi [mm] | 2.617 |
| |ΔTTL|/|ΔT12| | 1.000 | | |

3rd Embodiment

Figure 3B:
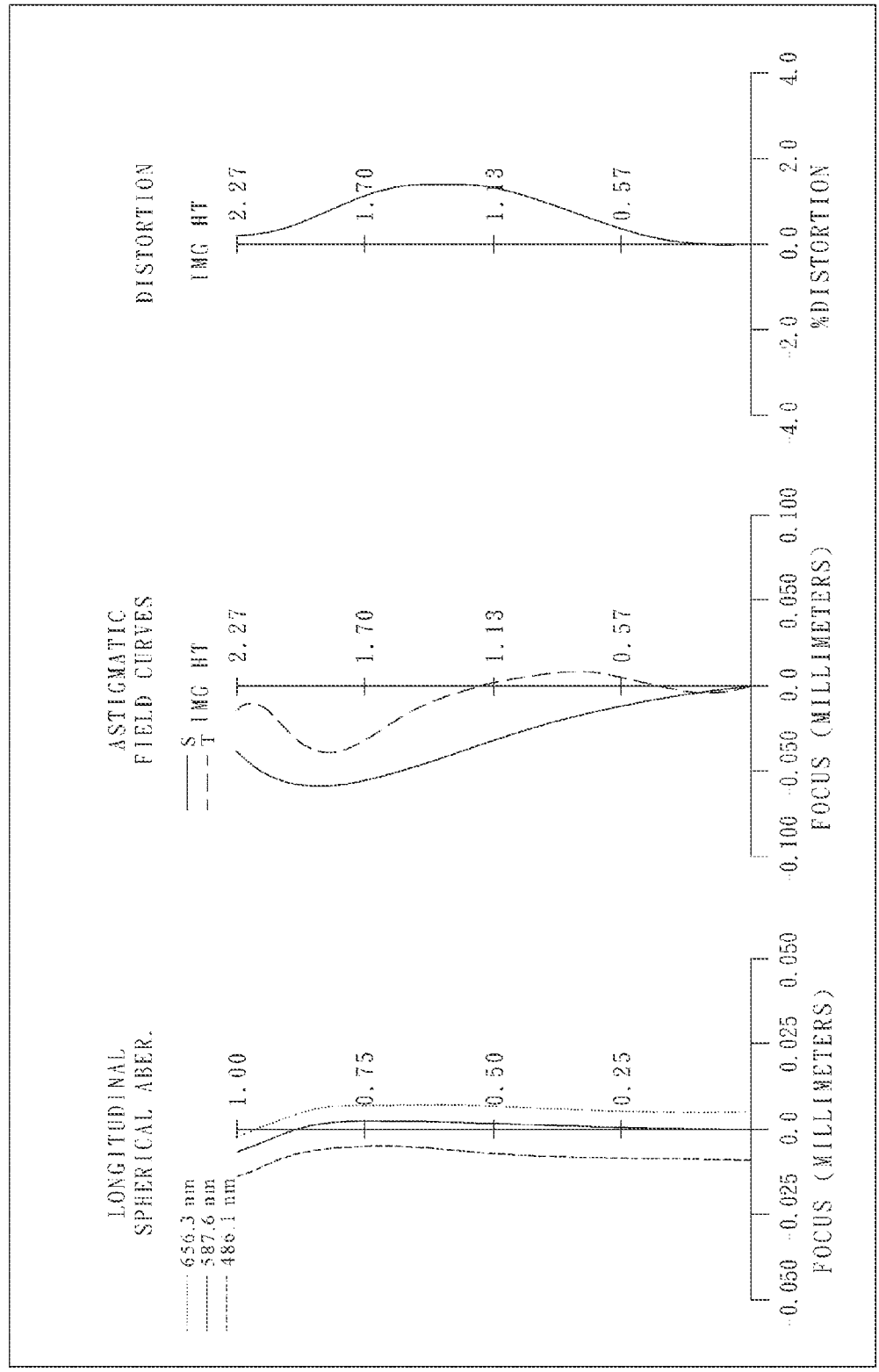
FIG. 3B shows spherical aberration curves, astigmatic field curves and a distortion curve of the optical system according to the 3rd embodiment when the object is at infinity.
Figure 3C:
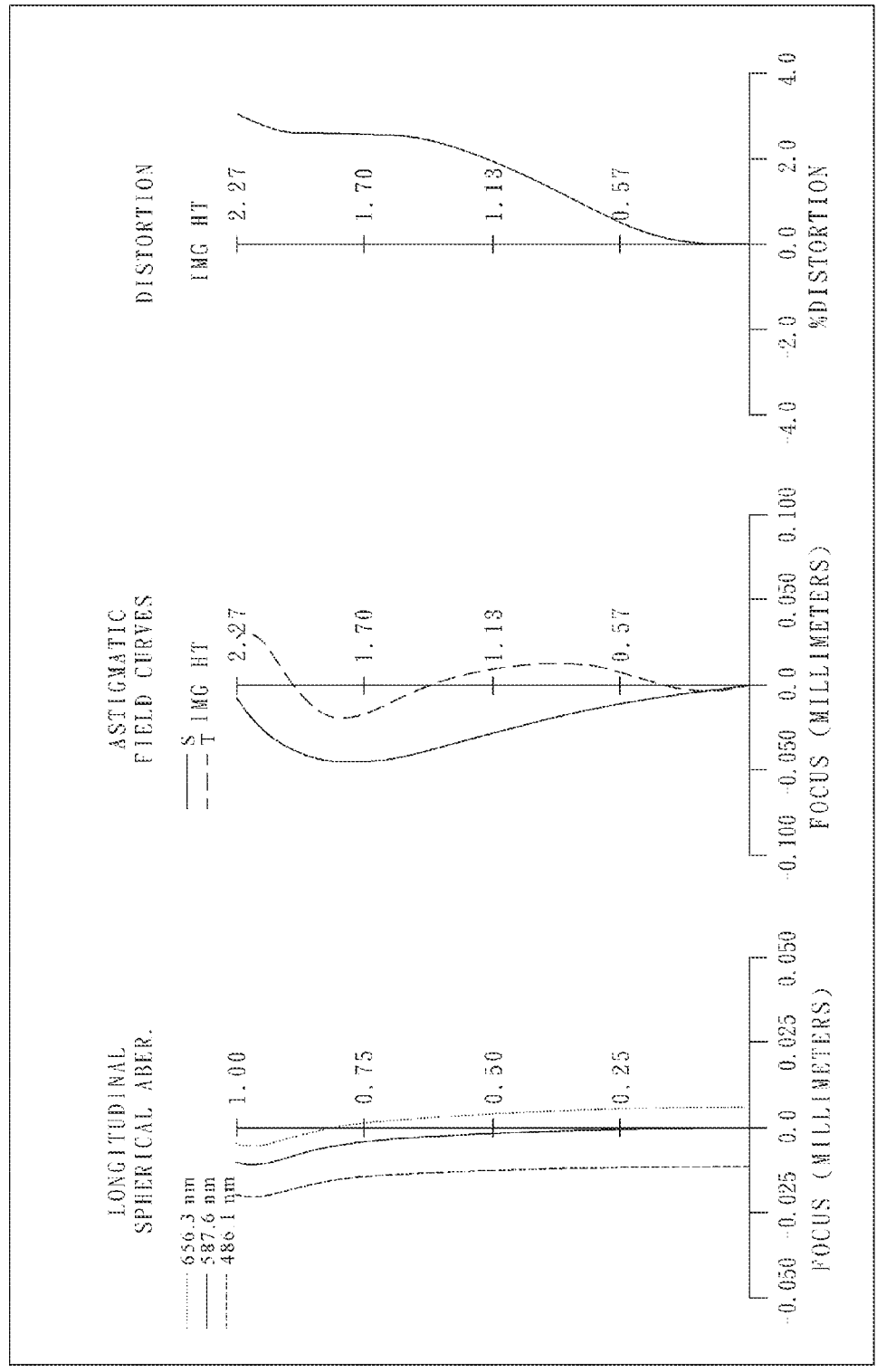
FIG. 3C shows spherical aberration curves, astigmatic field curves and a distortion curve of the optical system according to the 3rd embodiment when the object is at 100 mm.

FIG. 3A is a schematic view of an optical system according to the 3rd embodiment of the present disclosure. FIG. 3B shows spherical aberration curves, astigmatic field curves and a distortion curve of the optical system according to the 3rd embodiment (when the object is at infinity; i.e., at infinity). FIG. 3C shows spherical aberration curves, astigmatic field curves and a distortion curve of the optical system according to the 3rd embodiment (when the object is at 100 mm; i.e., at a close distance). In FIG. 3A, the optical system mainly comprises four lens elements with refractive power, in order from an object side to an image side:

A first lens group (G1) comprises,

A first lens element 310 with positive refractive power has a convex object-side surface 311 and a concave image-side surface 312, and is made of plastic material. The object-side surface 311 and the image-side surface 312 of the first lens element 310 are aspheric; and A second lens group (G2) comprises, in order from the object side to the image side:

A second lens element 320 with negative refractive power has a convex object-side surface 321 and a concave image-side surface 322, and is made of plastic material. The object-side surface 321 and the image-side surface 322 of the second lens element 320 are aspheric.

A third lens element 330 with positive refractive power has a concave object-side surface 331 and a convex image-side surface 332, and is made of plastic material. The object-side surface 331 and the image-side surface 332 of the third lens element 330 are aspheric.

A fourth lens element 340 with negative refractive power has a concave object-side surface 341 and a concave image-side surface 342 at a paraxial region, wherein the image-side surface 342 of the fourth lens element 340 changes from concave at the paraxial region to convex at a peripheral region. The fourth lens element 340 is made of plastic material, and the object-side surface 341 and the image-side surface 342 thereof are aspheric.

The optical system further comprises an aperture stop 300 which is disposed between an object and the first lens element 310. An IR-cut filter 350 made of glass is located between the fourth lens element 340 and the image plane 370, and has no effect on the focal length of the optical system.

The detailed optical data of the 3rd embodiment are shown in Table 5, and the aspheric surface data are shown in Table 6 below.

TABLE 5

Embodiment 3
Object Distance = Infinity: f = 3.03 mm, Fno = 2.65, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity, 100 | | | | |
| 1 | Ape. Stop | Plano | | −0.121 | | | | |
| 2 | Lens 1 | 1.374 | ASP | 0.405 | Plastic | 1.544 | 55.9 | 2.56 |
| 3 | | 82.293 | ASP | 0.109, 0.174 | | | | |
| 4 | Lens 2 | 9.054 | ASP | 0.275 | Plastic | 1.633 | 23.4 | −3.98 |
| 5 | | 1.948 | ASP | 0.320 | | | | |
| 6 | Lens 3 | −18.275 | ASP | 1.018 | Plastic | 1.535 | 55.7 | 1.41 |
| 7 | | −0.740 | ASP | 0.112 | | | | |
| 8 | Lens 4 | −10.272 | ASP | 0.300 | Plastic | 1.535 | 55.7 | −1.51 |
| 9 | | 0.889 | ASP | 0.500 | | | | |
| 10 | IR-cut filter | Plano | | 0.300 | Glass | 1.517 | 64.2 | — |
| 11 | | Plano | | 0.561 | | | | |
| 12 | Image | Plano | | | — | | | |

Note:
Reference wavelength (d-line) is 587.6 nm.
*Half of the effective diameter of the aperture stop at Surface 1 is 0.571 mm.
* Object Distance = 100 mm: surface 3 thickness = 0.174 mm, f = 3.01 mm

TABLE 6

| Aspheric Coefficients | | | | |
|---|---|---|---|---|
| Surface # | 2 | 3 | 4 | 5 |
| k = | 1.8173E−01 | 1.0000E+02 | −2.3391E+01 | 1.5483E+00 |
| A4 = | −5.8036E−03 | 2.5381E−02 | −2.5509E−02 | 8.4516E−03 |
| A5 = | 1.9010E−02 | 3.7905E−02 | | |
| A6 = | 2.1847E−02 | 2.6858E−02 | −2.3157E−02 | −4.1096E−03 |
| A7 = | 3.0080E−02 | 3.5112E−02 | | |
| A8 = | −1.0220E−01 | −2.3503E−01 | 4.9293E−02 | −2.1311E−02 |
| A9 = | 4.2552E−02 | 4.9780E−02 | | |
| A10 = | −6.1981E−02 | 8.2075E−01 | 5.0942E−02 | 9.7674E−02 |
| A11 = | 5.0844E−02 | 8.4017E−02 | | |
| A12 = | 6.4363E−01 | −4.4193E−01 | 2.4687E−01 | 7.9480E−03 |
| A13 = | 6.0112E−02 | 1.3544E−01 | | |
| A14 = | 6.0392E−01 | −1.1346E−01 | −8.8070E−02 | −6.4252E−03 |
| A15 = | 1.0870E−01 | 1.6629E−01 | | |
| A16 = | −2.8605E+00 | −1.2852E+00 | −5.8400E−01 | −7.6596E−02 |

| Surface # | 6 | 7 | 8 | 9 |
|---|---|---|---|---|
| k = | 1.0000E+02 | −4.1135E+00 | −1.0000E+00 | −7.8911E+00 |
| A4 = | 1.6012E−03 | −1.9311E−01 | −1.9397E−01 | −1.6920E−01 |
| A6 = | 2.5125E−02 | 1.3261E−01 | −2.9642E−02 | 9.5521E−02 |
| A8 = | 5.7102E−02 | −9.2975E−02 | 1.1613E−01 | −4.5552E−02 |
| A10 = | −1.5662E−01 | 4.9956E−02 | −9.6448E−02 | 1.4459E−02 |
| A12 = | 2.6052E−01 | 1.9202E−02 | 4.7145E−02 | −3.4865E−03 |
| A14 = | −1.5100E−01 | −1.3641E−02 | −9.8911E−03 | 6.9322E−04 |
| A16 = | 2.1984E−02 | 3.3764E−03 | 3.4815E−04 | −8.2036E−05 |

In the optical system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| Fi [mm] | 3.03 | sin(|ΔFOV|)*10 | 0.515 |
|---|---|---|---|
| Fm [mm] | 3.01 | R1/R2 | 0.020 |
| FOVi [deg.] | 73.6 | (R5 + R6)/(R5 − R6) | 1.08 |
| FOVm [deg.] | 70.6 | R8/R7 | −0.09 |
| Fno | 2.65 | Fi/f3 | 2.142 |
| V1/V2 | 2.39 | Fi/f4 | −1.997 |
| |ΔF|/|ΔT12| | 0.308 | Fi/Fm | 1.007 |

-continued

| |ΔT12|/CT2 | 0.236 | TDi [mm] | 2.604 |
|---|---|---|---|
| |ΔTTL|/|ΔT12| | 1.000 | | |

4th Embodiment

Figure 4A:
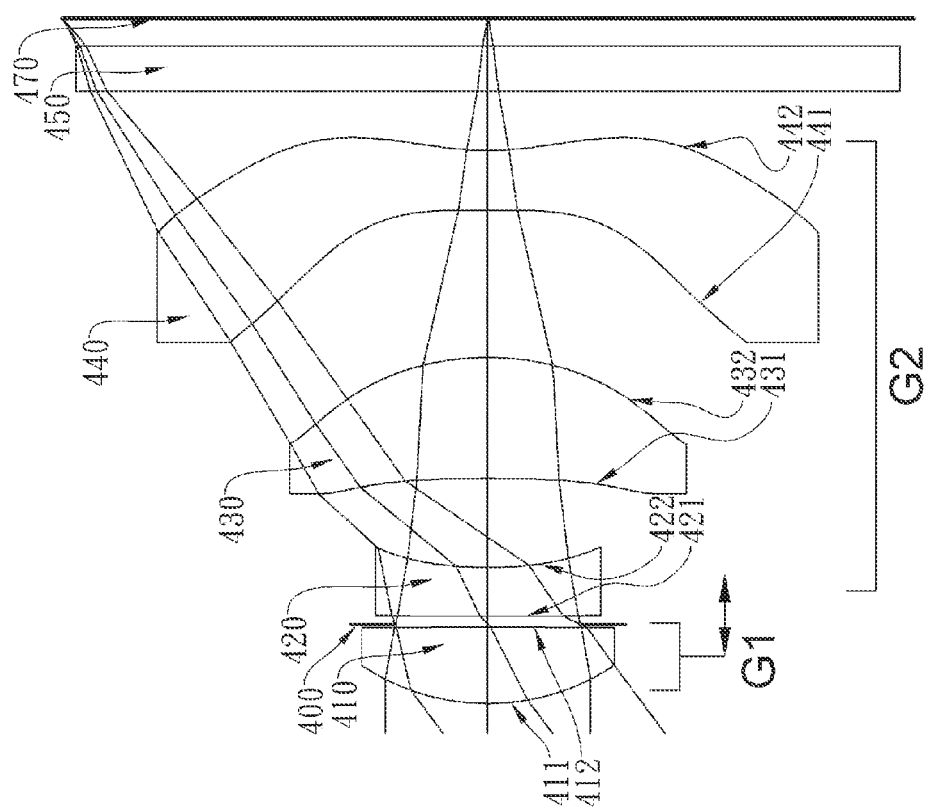
FIG. 4A is a schematic view of an optical system according to the 4th embodiment of the present disclosure.
Figure 4B:
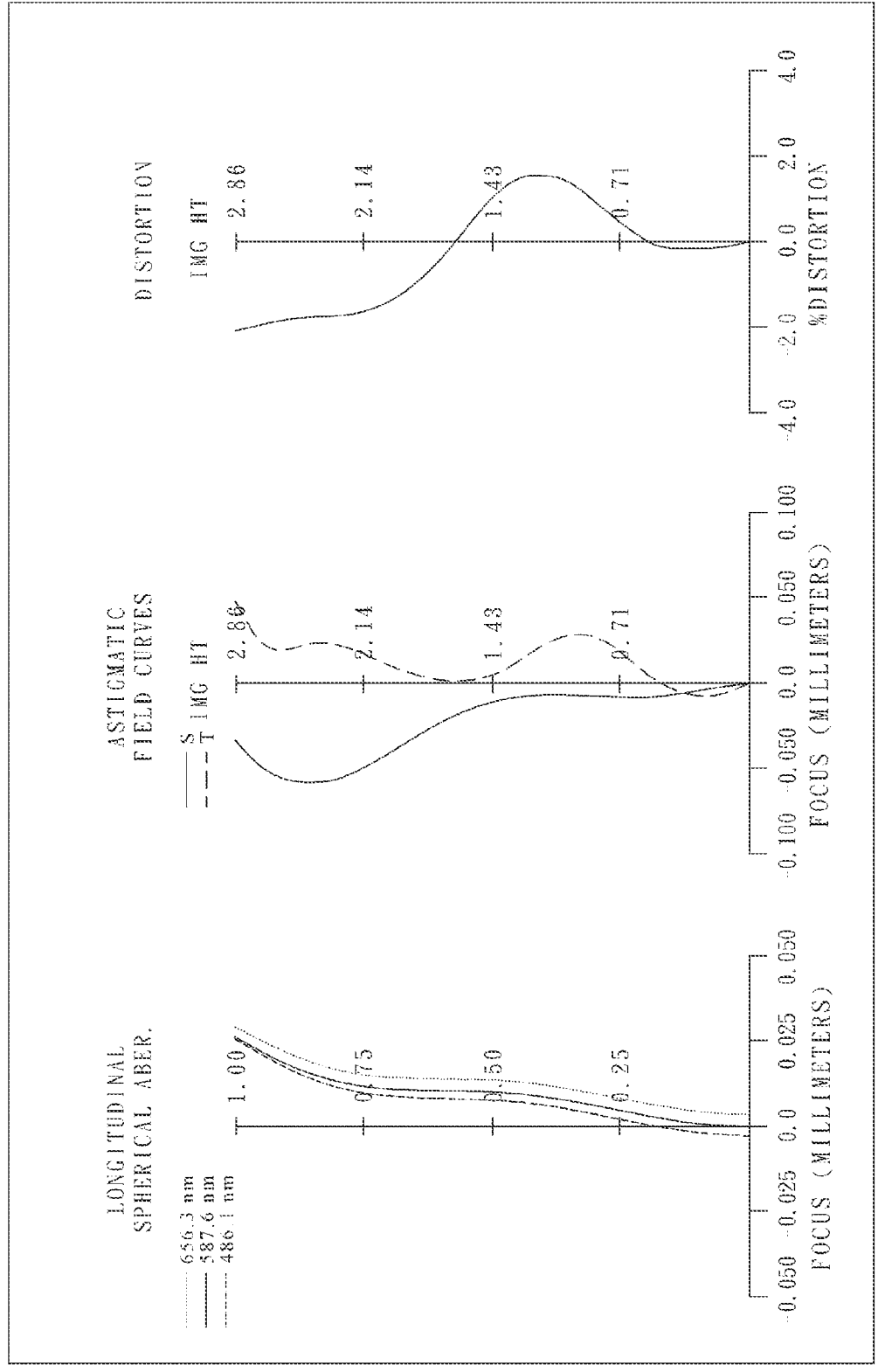
FIG. 4B shows spherical aberration curves, astigmatic field curves and a distortion curve of the optical system according to the 4th embodiment when the object is at infinity.

FIG. 4A is a schematic view of an optical system according to the 4th embodiment of the present disclosure. FIG. 4B shows spherical aberration curves, astigmatic field curves and a distortion curve of the optical system according to the 4th embodiment (when the object is at infinity; i.e., at infinity). FIG. 4C shows spherical aberration curves, astigmatic field curves and a distortion curve of the optical system according to the 4th embodiment (when the object is at 100 mm; i.e., at a close distance). In FIG. 4A, the optical system mainly comprises four lens elements with refractive power, in order from an object side to an image side:

A first lens group (G1) comprises,

A first lens element 410 with positive refractive power has a convex object-side surface 411 and a convex image-side surface 412, and is made of plastic material. The object-side surface 411 and the image-side surface 412 of the first lens element 410 are aspheric; and A second lens group (G2) comprises, in order from the object side to the image side:

A second lens element 420 with negative refractive power has a concave object-side surface 421 and a concave image-side surface 422, and is made of plastic material. The object-side surface 421 and the image-side surface 422 of the second lens element 420 are aspheric.

A third lens element 430 with positive refractive power has a concave object-side surface 431 and a convex image-side surface 432, and is made of plastic material. The object-side surface 431 and the image-side surface 432 of the third lens element 430 are aspheric.

A fourth lens element 440 with negative refractive power has a concave object-side surface 441 and a concave image-side surface 442 at a paraxial region, wherein the image-side surface 442 of the fourth lens element 440 changes from concave at the paraxial region to convex at a peripheral region. The fourth lens element 440 is made of plastic material, and the object-side surface 441 and the image-side surface 442 thereof are aspheric.

The optical system further comprises an aperture stop 400 which is disposed between the first lens element 410 and the second lens element 420. An IR-cut filter 450 made of glass is located between the fourth lens element 440 and the image plane 470, and has no effect on the focal length of the optical system.

The detailed optical data of the 4th embodiment are shown in Table 7, and the aspheric surface data are shown in Table 8 below.

TABLE 7

Embodiment 4
Object Distance = Infinity: f = 3.89 mm, Fno = 2.83, HFOV = 36.7 deg.

| Surface # |  | Curvature Radius |  | Thickness | Material | Index | Abbe # | Focal Length |
|---|---|---|---|---|---|---|---|---|
| 0 | Object | Plano |  | Infinity, 100 |  |  |  |  |
| 1 | Lens 1 | 1.534 | ASP | 0.514 | Plastic | 1.544 | 55.9 | 2.69 |
| 2 |  | −27.197 | ASP | 0.017 |  |  |  |  |
| 3 | Ape. Stop | Plano |  | 0.055, 0.124 |  |  |  |  |
| 4 | Lens 2 | −100.000 | ASP | 0.327 | Plastic | 1.639 | 23.5 | −4.06 |
| 5 |  | 2.669 | ASP | 0.598 |  |  |  |  |
| 6 | Lens 3 | −12.034 | ASP | 0.812 | Plastic | 1.535 | 55.7 | 4.10 |
| 7 |  | −1.897 | ASP | 0.990 |  |  |  |  |
| 8 | Lens 4 | −101.913 | ASP | 0.400 | Plastic | 1.535 | 55.7 | −3.28 |
| 9 |  | 1.789 | ASP | 0.400 |  |  |  |  |
| 10 | IR-cut filter | Plano |  | 0.300 | Glass | 1.517 | 64.2 | — |
| 11 |  | Plano |  | 0.188 |  |  |  |  |
| 12 | Image | Plano |  | — |  |  |  |  |

Note:
Reference wavelength (d-line) is 587.6 nm.
*Half of the effective diameter of the aperture stop at Surface 3 is 0.622 mm.
* Object Distance = 100 mm: surface 3 thickness = 0.124 mm, f = 3.78 mm

TABLE 8

Aspheric Coefficients

| Surface # | 1 | 2 | 4 | 5 |
|---|---|---|---|---|
| k = | −7.3854E−01 | −9.9000E+01 | −1.0000E+00 | 4.6832E+00 |
| A4 = | 2.3807E−02 | 3.2271E−02 | 5.0335E−02 | 5.1613E−02 |
| A6 = | 2.5955E−02 | −2.1099E−02 | −1.7438E−02 | −8.7368E−03 |
| A8 = | −2.2436E−02 | 2.8826E−02 | −5.8349E−02 | −9.7451E−03 |
| A10 = | 6.5253E−03 | −1.9610E−02 | 1.6417E−01 | 5.8955E−02 |
| A12 = | 1.9562E−03 | −1.5870E−02 | −2.6128E−01 | −4.7196E−02 |
| A14 = | 7.4884E−02 | 8.3808E−03 | 1.4890E−01 | 3.4196E−03 |
| A16 = | −7.9411E−02 | 4.3931E−10 | −2.4652E−10 | −2.9835E−02 |

| Surface # | 6 | 7 | 8 | 9 |
|---|---|---|---|---|
| k = | 5.1532E+01 | −3.5363E+00 | −9.9000E+01 | −1.7672E+01 |
| A4 = | −4.0354E−02 | −9.6368E−02 | −3.5293E−01 | −9.3999E−02 |
| A6 = | −3.4176E−02 | 7.4250E−03 | 2.1664E−01 | 3.3729E−02 |
| A8 = | 4.3459E−02 | −8.7198E−03 | −1.7853E−01 | −2.5938E−02 |

TABLE 8-continued

| Aspheric Coefficients | | | | |
|---|---|---|---|---|
| A10 = | −2.8482E−02 | 5.8299E−03 | 1.2456E−01 | 1.2523E−02 |
| A12 = | 1.2956E−02 | 4.0421E−04 | −4.7054E−02 | −2.9631E−03 |
| A14 = | 1.2459E−02 | −5.6400E−04 | 8.7603E−03 | 3.3799E−04 |
| A16 = | −7.0536E−03 | 5.7811E−04 | −6.4147E−04 | −1.5153E−05 |

In the optical system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| Fi [mm] | 3.89 | sin(|ΔFOV|)*10 | 0.527 |
|---|---|---|---|
| Fm [mm] | 3.78 | R1/R2 | −0.060 |
| FOVi [deg.] | 73.4 | (R5 + R6)/(R5 − R6) | 1.37 |
| FOVm [deg.] | 70.4 | R8/R7 | −0.02 |
| Fno | 2.83 | Fi/f3 | 0.951 |
| V1/V2 | 2.38 | Fi/f4 | −1.187 |
| |AFi|/|ΔT12| | 1.594 | Fi/Fm | 1.029 |
| |ΔT12|/CT2 | 0.211 | TDi [mm] | 3.782 |
| |ΔTTL|/|ΔT12| | 1.000 | | |

5th Embodiment

Figure 5B:
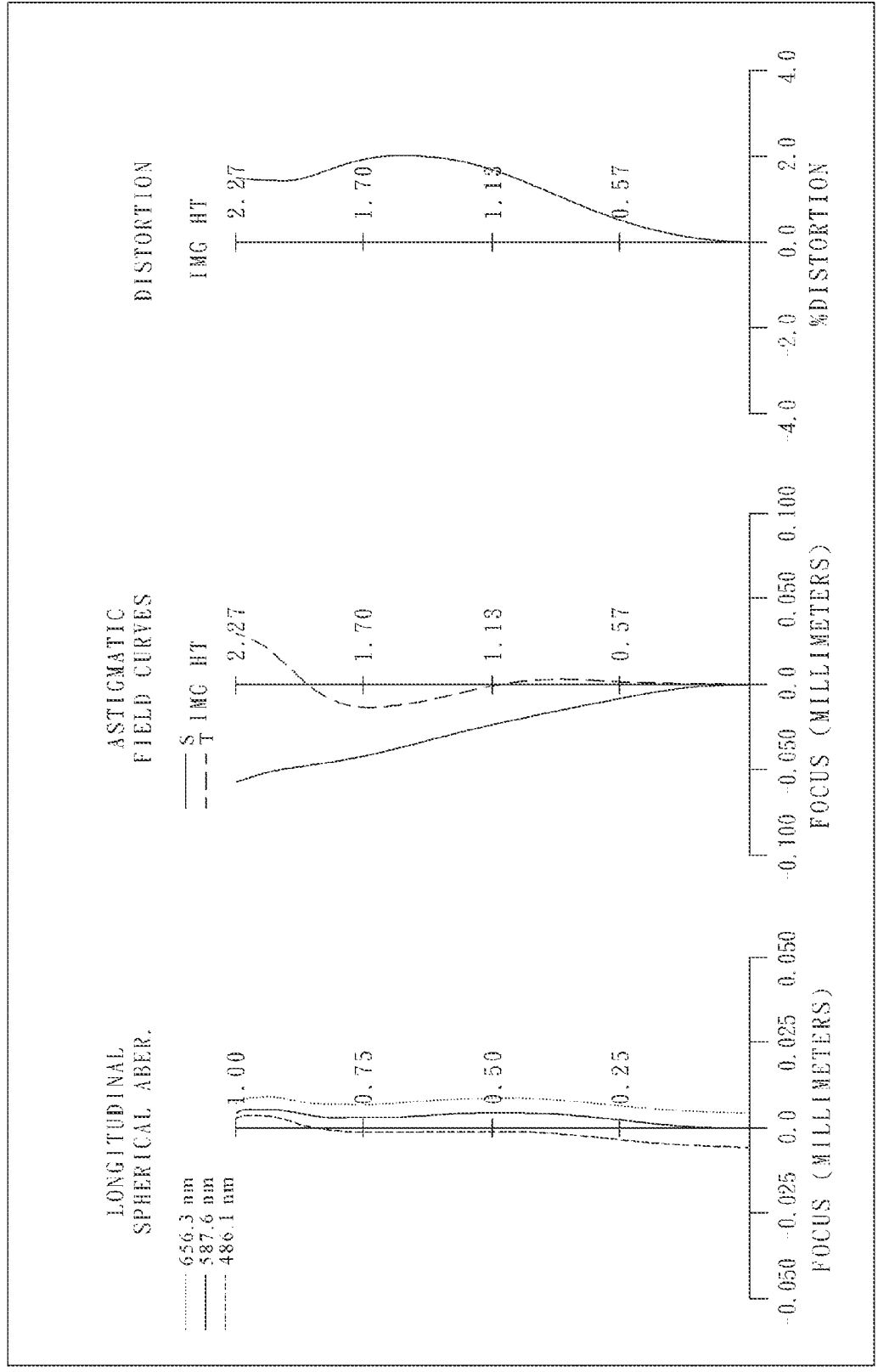
FIG. 5B shows spherical aberration curves, astigmatic field curves and a distortion curve of the optical system according to the 5th embodiment when the object is at infinity.
Figure 5C:
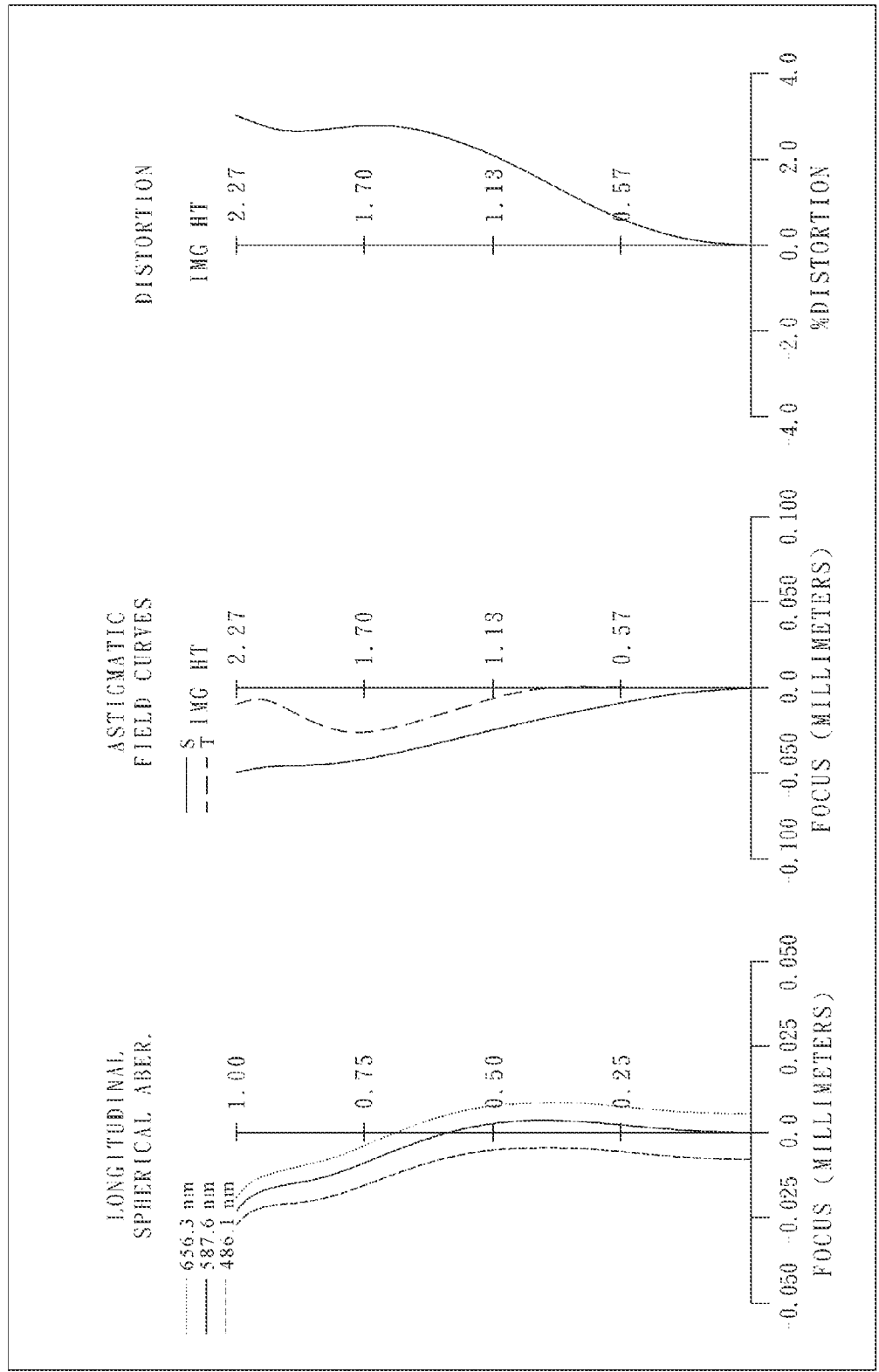
FIG. 5C shows spherical aberration curves, astigmatic field curves and a distortion curve of the optical system according to the 5th embodiment when the object is at 100 mm.

FIG. 5A is a schematic view of an optical system according to the 5th embodiment of the present disclosure. FIG. 5B shows spherical aberration curves, astigmatic field curves and a distortion curve of the optical system according to the 5th embodiment (when the object is at infinity; i.e., at infinity). FIG. 5C shows spherical aberration curves, astigmatic field curves and a distortion curve of the optical system according to the 5th embodiment (when the object is at 100 mm; i.e., at a close distance). In FIG. 5A, the optical system mainly comprises four lens elements with refractive power, in order from an object side to an image side:

A first lens group (G1) comprises,
A first lens element 510 with positive refractive power has a convex object-side surface 511 and a convex image-side surface 512, and is made of plastic material. The object-side surface 511 and the image-side surface 512 of the first lens element 510 are aspheric; and A second lens group (G2) comprises, in order from the object side to the image side:
A second lens element 520 with negative refractive power has a concave object-side surface 521 and a concave image-side surface 522, and is made of plastic material. The object-side surface 521 and the image-side surface 522 of the second lens element 520 are aspheric.

A third lens element 530 with positive refractive power has a concave object-side surface 531 and a convex image-side surface 532, and is made of plastic material. The object-side surface 531 and the image-side surface 532 of the third lens element 530 are aspheric.

A fourth lens element 540 with negative refractive power has a concave object-side surface 541 and a concave image-side surface 542 at a paraxial region, wherein the image-side surface 542 of the fourth lens element 540 changes from concave at the paraxial region to convex at a peripheral region. The fourth lens element 540 is made of plastic material, and the object-side surface 541 and the image-side surface 542 thereof are aspheric.

The optical system further comprises an aperture stop 500 which is disposed between an object and the first lens element 510. An IR-cut filter 550 made of glass and a cover glass 560 are located in order between the fourth lens element 540 and the image plane 570, and both of them has no effect on the focal length of the optical system.

The detailed optical data of the 5th embodiment are shown in Table 9, and the aspheric surface data are shown in Table 10 below.

TABLE 9

Embodiment 5
Object Distance = Infinity: f = 3.19 mm, Fno = 2.56, HFOV = 35.0 deg.

| Surface # | | Curvature Radius | | Thickness | Material | Index | Abbe # | Focal Length |
|---|---|---|---|---|---|---|---|---|
| 0 | Object | Plano | | Infinity, 100 | | | | |
| 1 | Ape. Stop | Plano | | −0.166 | | | | |
| 2 | Lens 1 | 1.270 | ASP | 0.437 | Plastic | 1.544 | 55.9 | 2.16 |
| 3 | | −13.452 | ASP | 0.085, 0.125 | | | | |
| 4 | Lens 2 | −6.275 | ASP | 0.331 | Plastic | 1.639 | 23.5 | −3.78 |
| 5 | | 4.009 | ASP | 0.655 | | | | |
| 6 | Lens 3 | −4.484 | ASP | 0.558 | Plastic | 1.530 | 55.8 | 2.23 |
| 7 | | −0.976 | ASP | 0.294 | | | | |
| 8 | Lens 4 | −5.810 | ASP | 0.300 | Plastic | 1.535 | 55.7 | −1.97 |
| 9 | | 1.314 | ASP | 0.300 | | | | |
| 10 | IR-cut filter | Plano | | 0.200 | Glass | 1.517 | 64.2 | — |
| 11 | | Plano | | 0.100 | | | | |
| 12 | Cover-glass | Plano | | 0.300 | Glass | 1.517 | 64.2 | — |
| 13 | | Plano | | 0.239 | | | | |
| 14 | Image | Plano | | — | | | | |

Note:
Reference wavelength (d-line) is 587.6 nm.
*Half of the effective diameter of the aperture stop at Surface 1 is 0.693 mm.
* Object Distance = 100 mm: surface 3 thickness = 0.125 mm, f = 3.13 mm

TABLE 10

Aspheric Coefficients

| Surface # | 2 | 3 | 4 | 5 |
|---|---|---|---|---|
| k = | −1.6860E−01 | 1.0000E+02 | −6.0009E+01 | 1.5072E+01 |
| A4 = | 1.8699E−03 | 6.9248E−02 | 1.3707E−01 | 1.7917E−01 |
| A6 = | 5.1264E−02 | −1.5517E−02 | −1.8007E−01 | −9.9450E−02 |
| A8 = | −9.1431E−02 | −4.4088E−01 | −9.0912E−02 | −1.1193E−01 |
| A10 = | −7.1584E−02 | 7.2971E−01 | 2.0492E−01 | 1.9947E−01 |
| A12 = | 2.3824E−01 | −2.6824E−02 | 7.4092E−01 | 1.3528E−01 |
| A14 = | −1.4933E−01 | 7.7065E−01 | 2.8705E−01 | 6.4693E−02 |
| A16 = | 1.9810E−02 | −2.3470E+00 | −2.0462E+00 | −1.8298E−01 |

| Surface # | 6 | 7 | 8 | 9 |
|---|---|---|---|---|
| k = | 7.8267E+00 | −3.8974E+00 | −1.0000E+00 | −8.3520E+00 |
| A4 = | −1.2425E−02 | −1.4334E−01 | −1.4429E−01 | −1.4480E−01 |
| A6 = | −6.9141E−03 | 1.3236E−01 | 4.8225E−03 | 8.3068E−02 |
| A8 = | 5.8474E−02 | −9.7482E−02 | 9.1402E−02 | −4.1296E−02 |
| A10 = | −1.7541E−01 | 5.5514E−02 | −8.5491E−02 | 1.3954E−02 |
| A12 = | 2.4150E−01 | 2.3555E−02 | 4.4362E−02 | −3.6211E−03 |
| A14 = | −1.5368E−01 | −1.4047E−02 | −1.2316E−02 | 6.4906E−04 |
| A16 = | 3.9318E−02 | −2.2876E−03 | 1.3702E−03 | −5.6859E−05 |

In the optical system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| Fi [mm] | 3.19 | sin(|ΔFOV|)*10 | 0.345 |
| Fm [mm] | 3.13 | R1/R2 | −0.090 |
| FOVi [deg.] | 70.0 | (R5 + R6)/(R5 − R6) | 1.56 |
| FOVm [deg.] | 68.0 | R8/R7 | −0.23 |
| Fno | 2.56 | Fi/f3 | 1.429 |
| V1/V2 | 2.38 | Fi/f4 | −1.614 |
| |ΔFi|/|ΔT12| | 1.500 | Fi/Fm | 1.019 |
| |ΔT12|/CT2 | 0.121 | TDi [mm] | 2.700 |
| |ΔTTL|/|ΔT12| | 1.000 | | |

6th Embodiment

Figure 6A:
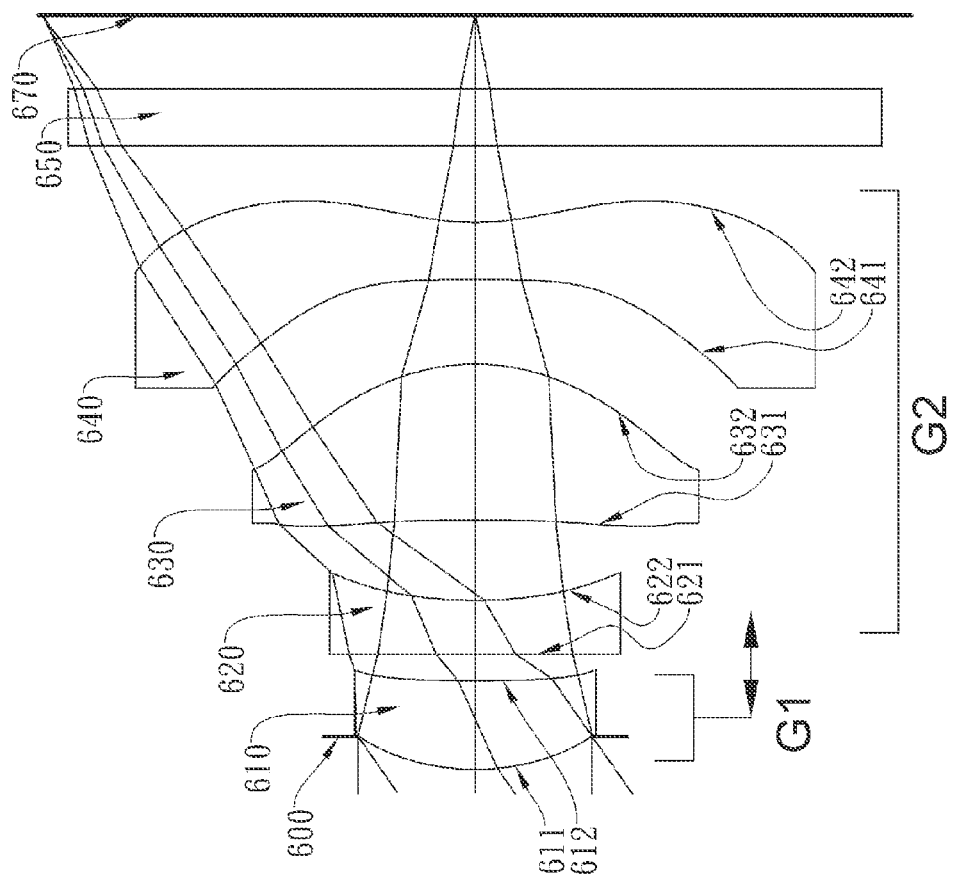
FIG. 6A is a schematic view of an optical system according to the 6th embodiment of the present disclosure.
Figure 6B:
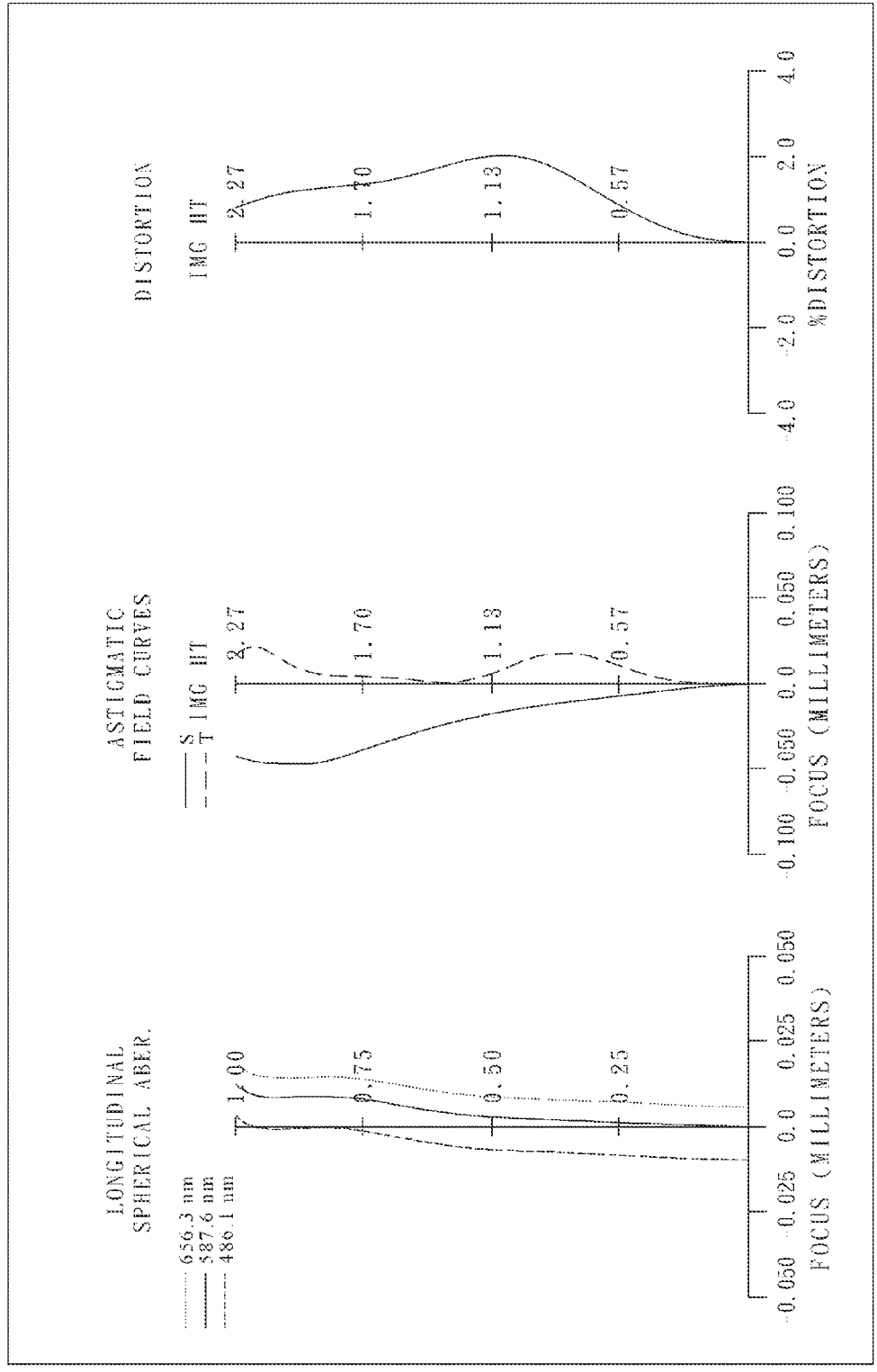
FIG. 6B shows spherical aberration curves, astigmatic field curves and a distortion curve of the optical system according to the 6th embodiment when the object is at infinity.
Figure 6C:
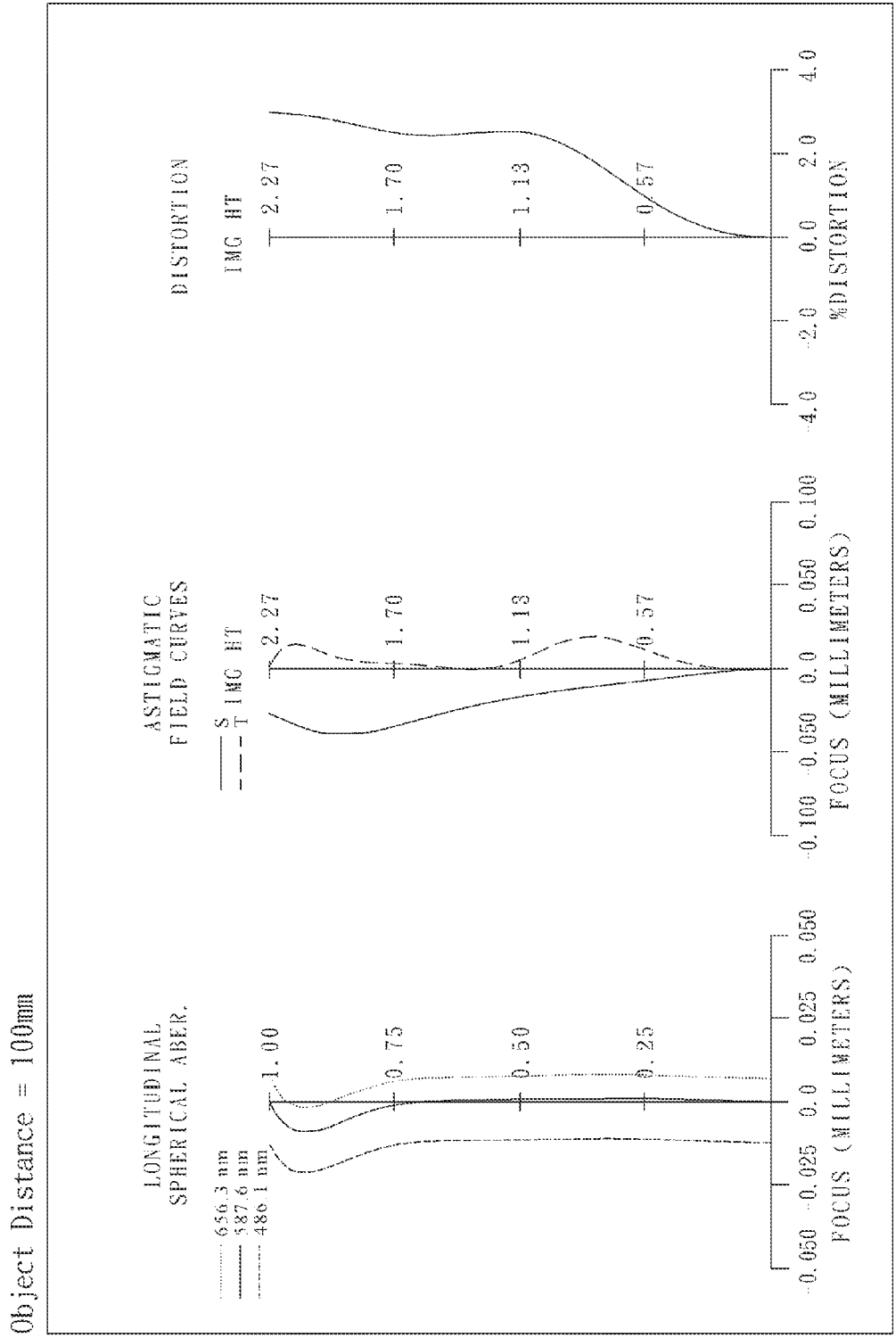
FIG. 6C shows spherical aberration curves, astigmatic field curves and a distortion curve of the optical system according to the 6th embodiment when the object is at 100 mm.

FIG. 6A is a schematic view of an optical system according to the 6th embodiment of the present disclosure. FIG. 6B shows spherical aberration curves, astigmatic field curves and a distortion curve of the optical system according to the 6th embodiment (when the object is at infinity; i.e., at infinity). FIG. 6C shows spherical aberration curves, astigmatic field curves and a distortion curve of the optical system according to the 6th embodiment (when the object is at 100 mm; i.e., at a close distance). In FIG. 6A, the optical system mainly comprises four lens elements with refractive power, in order from an object side to an image side:

A first lens group (G1) comprises,

A first lens element 610 with positive refractive power has a convex object-side surface 611 and a concave image-side surface 612, and is made of plastic material. The object-side surface 611 and the image-side surface 612 of the first lens element 610 are aspheric; and A second lens group (G2) comprises, in order from the object side to the image side:

A second lens element 620 with negative refractive power has a concave object-side surface 621 and a concave image-side surface 622, and is made of plastic material. The object-side surface 621 and the image-side surface 622 of the second lens element 620 are aspheric.

A third lens element 630 with positive refractive power has a concave object-side surface 631 and a convex image-side surface 632, and is made of plastic material. The object-side surface 631 and the image-side surface 632 of the third lens element 630 are aspheric.

A fourth lens element 640 with negative refractive power has a concave object-side surface 641 and a concave image-side surface 642 at a paraxial region, wherein the image-side surface 642 of the fourth lens element 640 changes from concave at the paraxial region to convex at a peripheral region. The fourth lens element 640 is made of plastic material, and the object-side surface 641 and the image-side surface 642 thereof are aspheric.

The optical system further comprises an aperture stop 600 which is disposed between an object and the first lens element 610. An IR-cut filter 650 made of glass is located between the fourth lens element 640 and the image plane 670, and has no effect on the focal length of the optical system.

The detailed optical data of the 6th embodiment are shown in Table 11, and the aspheric surface data are shown in Table 12 below.

TABLE 11

Embodiment 6
Object Distance = Infinity: f = 3.21 mm, Fno = 2.67, HFOV = 35.0 deg.

| Surface # | | Curvature Radius | | Thickness | Material | Index | Abbe # | Focal Length |
|---|---|---|---|---|---|---|---|---|
| 0 | Object | Plano | | Infinity, 100 | | | | |
| 1 | Ape. Stop | Plano | | −0.171 | | | | |
| 2 | Lens 1 | 1.236 | ASP | 0.464 | Plastic | 1.544 | 55.9 | 2.56 |

TABLE 11-continued

Embodiment 6
Object Distance = Infinity: f = 3.21 mm, Fno = 2.67, HFOV = 35.0 deg.

| Surface # | | Curvature Radius | | Thickness | Material | Index | Abbe # | Focal Length |
|---|---|---|---|---|---|---|---|---|
| 3 | | 9.541 | ASP | 0.141, 0.202 | | | | |
| 4 | Lens 2 | −40.273 | ASP | 0.281 | Plastic | 1.639 | 23.5 | −3.89 |
| 5 | | 2.658 | ASP | 0.422 | | | | |
| 6 | Lens 3 | −8.332 | ASP | 0.815 | Plastic | 1.530 | 55.8 | 2.31 |
| 7 | | −1.105 | ASP | 0.442 | | | | |
| 8 | Lens 4 | −100.000 | ASP | 0.300 | Plastic | 1.535 | 55.7 | −2.49 |
| 9 | | 1.349 | ASP | 0.400 | | | | |
| 10 | IR-cut filter | Plano | | 0.300 | Glass | 1.517 | 64.2 | — |
| 11 | | Plano | | 0.385 | | | | |
| 12 | Image | Plano | | — | | | | |

Note:
Reference wavelength (d-line) is 587.6 nm.
*Half of the effective diameter of the aperture stop at Surface 1 is 0.613 mm.
* Object Distance = 100 mm: surface 3 thickness = 0.202 mm, f = 3.17 mm

TABLE 12

Aspheric Coefficients

| Surface # | 2 | 3 | 4 | 5 |
|---|---|---|---|---|
| k = | 1.5061E−01 | 9.8287E+01 | 8.5682E+01 | 9.1161E+00 |
| A4 = | 2.8280E−02 | 1.0803E−01 | 9.2880E−02 | 1.1527E−01 |
| A6 = | 1.2535E−01 | 1.6022E−01 | −1.6879E−01 | −1.7663E−01 |
| A8 = | −1.1505E−01 | −1.0521E−01 | −3.1223E−01 | −1.0297E−01 |
| A10 = | 1.9378E−01 | −7.9017E−02 | 6.8229E−01 | 3.3428E−02 |
| A12 = | 1.1355E+00 | 2.4903E+00 | 3.2377E−01 | 1.7224E−01 |
| A14 = | −1.4363E+00 | 1.0316E+00 | 5.8207E−01 | 2.9915E−01 |
| A16 = | 4.8007E−01 | −1.8187E+00 | −2.9120E+00 | −1.1349E+00 |

| Surface # | 6 | 7 | 8 | 9 |
|---|---|---|---|---|
| k = | −1.0000E+02 | −3.9922E+00 | −1.0000E+00 | −6.9436E+00 |
| A4 = | −1.8077E−02 | −2.2969E−01 | −3.6060E−01 | −2.0361E−01 |
| A6 = | −3.2043E−02 | 1.4439E−01 | 8.3102E−02 | 9.7382E−02 |
| A8 = | 1.3361E−01 | −1.0176E−01 | 1.0034E−01 | −3.5364E−02 |
| A10 = | −1.6361E−01 | 4.3719E−02 | −8.8589E−02 | 1.1756E−02 |
| A12 = | 2.1689E−01 | 2.0070E−02 | 4.0503E−02 | −3.5994E−03 |
| A14 = | −1.6608E−01 | −1.0171E−02 | −1.3761E−02 | 6.9080E−04 |
| A16 = | 4.7532E−02 | 9.3385E−04 | 2.2358E−03 | −6.0655E−05 |

In the optical system according to the 6th embodiment, the definitions of these parameters shown in the following table are the same as those stated in the 1st embodiment with corresponding values for the 6th embodiment. Moreover, these parameters can be calculated from Table 11 Table 12 as the following values and satisfy the following relationships:

| Fi [mm] | 3.21 | sin(\|ΔFOV\|)*10 | 0.445 |
|---|---|---|---|
| Fm [mm] | 3.17 | R1/R2 | 0.130 |
| FOVi [deg.] | 70.0 | (R5 + R6)/(R5 − R6) | 1.31 |
| FOVm [deg.] | 67.5 | R8/R7 | −0.01 |
| Fno | 2.67 | Fi/f3 | 1.387 |
| V1/V2 | 2.38 | Fi/f4 | −1.290 |
| \|ΔFl\|/\|ΔT12\| | 0.656 | Fi/Fm | 1.013 |
| \|ΔT12\|/CT2 | 0.217 | TDi [mm] | 2.926 |
| \|ΔTTL\|/\|ΔT12\| | 1.000 | | |

It is to be noted that TABLES 1-12 show different data of the different embodiments; however, the data of the different embodiments are obtained from experiments. Therefore, any imaging lens system of the same structure is considered to be less than or equal to the scope of the present disclosure even if it uses different data. The embodiments depicted above and the appended drawings are exemplary and are not intended to limit the scope of the present disclosure.

What is claimed is:

1. An optical system comprising, in order from an object side to an image side:
   a first lens group comprising:
     a first lens element with positive refractive power having a convex object-side surface;
   a second lens group comprising, in order from the object side to the image side:
     a second lens element with negative refractive power having a concave image-side surface;
     a third lens element with positive refractive power having a convex image-side surface; and
     a fourth lens element with negative refractive power having a concave object-side surface and a concave image-side surface at a paraxial region, wherein the image-side surface of the fourth lens element changes from concave at the paraxial region to convex at a peripheral region, and the object-side surface and the image-side surface of the fourth lens element are aspheric;
   wherein an object moves closer towards or further away the optical system, the focusing adjustment is performed by moving the first lens element along an optical axis; the optical system has a total of four lens elements with refractive power, a difference of an axial distance between the first lens element and the second lens element of the optical system focused on the object at a close distance and infinity is ΔT12, a central thickness of the second lens element is CT2, and the following relationship is satisfied:

0.05<|ΔT12|/CT2<0.80.

2. The optical system of claim 1, further comprising:
a stop located between the object and the second lens element.

3. The optical system of claim 2, wherein both of the object-side surface and the image-side surface of the second lens element and the third lens element are aspheric; and the second lens element, the third lens element and the fourth lens element are made of plastic material.

4. The optical system of claim 3, wherein a difference of a distance between the object-side surface of the first lens element and an image plane of the optical system focused on an object at a close distance and infinity is ΔTTL, the difference of an axial distance between the first lens element and the second lens element of the optical system focused on an object at a close distance and infinity is ΔT12, and the following relationship is satisfied:

0.95<|ΔTTL|/|ΔT12|<1.05.

5. The optical system of claim 3, wherein a difference of a maximal field of view of the optical system focused on an object at a close distance and infinity is ΔFOV, and the following relationship is satisfied:

0.1<sin(|ΔFOV|)*10<1.0.

6. The optical system of claim 3, wherein a focal length of the optical system focused on an object at infinity is Fi, a focal length of the third lens element is f3, and the following relationship is satisfied:

1.5<Fi/f3<3.0.

7. The optical system of claim 3, wherein the difference of an axial distance between the first lens element and the second lens element of the optical system focused on an object at a close distance and infinity is ΔT12, the central thickness of the second lens element is CT2, and the following relationship is satisfied:

0.05<|ΔT12|/CT2<0.50.

8. The optical system of claim 3, wherein a curvature radius of the image-side surface of the fourth lens element is R8, a curvature radius of the object-side surface of the fourth lens element is R7, and the following relationship is satisfied:

−1.0<R8/R7<0.

9. The optical system of claim 8, wherein the object-side surface of the second lens element is concave.

10. The optical system of claim 8, wherein a curvature radius of the object-side surface of the third lens element is R5, a curvature radius of the image-side surface of the third lens element is R6, and the following relationship is satisfied:

1.0<(R5+R6)/(R5−R6)<3.0.

11. The optical system of claim 8, wherein the curvature radius of the image-side surface of the fourth lens element is R8, the curvature radius of the object-side surface of the fourth lens element is R7, and the following relationship is satisfied:

−0.5<R8/R7<0.

12. The optical system of claim 8, wherein an Abbe number of the first lens element is V1, an Abbe number of the second lens element is V2, and the following relationship is satisfied:

1.65<V1/V2<3.0.

13. The optical system of claim 8, wherein the focal length of the optical system focused on an object at infinity is Fi, a focal length of the optical system focused on an object at a close distance is Fm, and the following relationship is satisfied:

1.0<Fi/Fm<1.06.

14. The optical system of claim 8, wherein a curvature radius of the object-side surface of the first lens element is R1, a curvature radius of the image-side surface of the first lens element is R2, and the following relationship is satisfied:

−0.7<R1/R2<0.3.

15. The optical system of claim 8, wherein the focal length of the optical system focused on an object at infinity is Fi, a focal length of the fourth lens element is f4, and the following relationship is satisfied:

−3.0<Fi/f4<−1.6.

16. The optical system of claim 8, wherein an f-number of the optical system is Fno, and the following relationship is satisfied:

1.8<Fno<3.0.

17. The optical system of claim 3, wherein a distance between the object-side surface of the first lens element and the image-side surface of the fourth lens element of the optical system focused on an object at infinity is TDi, and the following relationship is satisfied:

1.5 mm<TDi<4.5 mm.

18. The optical system of claim 3, wherein a difference of a focal length of the optical system focused on an object at a close distance and infinity is ΔF, the difference of an axial distance between the first lens element and the second lens element of the optical system focused on an object at a close distance and infinity is ΔT12, and the following relationship is satisfied:

|ΔF|/|ΔT12|<2.0.

* * * * *